United States Patent
Horie et al.

(10) Patent No.: US 7,264,344 B2
(45) Date of Patent: Sep. 4, 2007

(54) ELECTROSTATIC INKJET INK COMPOSITION

(75) Inventors: Seiji Horie, Shizuoka (JP); Yutaka Sakasai, Shizuoka (JP)

(73) Assignee: Fujifilm Corporation, Tokyo (JP)

( * ) Notice: Subject to any disclaimer, the term of this patent is extended or adjusted under 35 U.S.C. 154(b) by 353 days.

(21) Appl. No.: 10/781,760

(22) Filed: Feb. 20, 2004

(65) Prior Publication Data

US 2004/0165050 A1    Aug. 26, 2004

(30) Foreign Application Priority Data

| Feb. 21, 2003 | (JP) | ............ P.2003-044500 |
| Feb. 27, 2003 | (JP) | ............ P.2003-051020 |
| Feb. 27, 2003 | (JP) | ............ P.2003-051021 |

(51) Int. Cl.
    *G01D 11/00*    (2006.01)
(52) U.S. Cl. ............ 347/100; 347/112; 523/160
(58) Field of Classification Search ........ 347/100, 347/112, 95, 96, 101; 523/160, 161; 524/394, 524/556; 106/31.85, 31.6, 31.27, 31.13
    See application file for complete search history.

(56) References Cited

U.S. PATENT DOCUMENTS

2002/0058729 A1*  5/2002  Oshima .................. 523/160
2003/0225188 A1   12/2003  Horie

FOREIGN PATENT DOCUMENTS

| EP | 1 367 102 A1 | 12/2003 |
| JP | 6-19595 B2 | 3/1994 |
| JP | 6-19596 B2 | 3/1994 |
| JP | 6-23865 B2 | 3/1994 |
| JP | 9-193389 A | 7/1997 |
| JP | 2001-139856 A | 5/2001 |

* cited by examiner

*Primary Examiner*—Manish S. Shah
(74) *Attorney, Agent, or Firm*—Sughrue Mion, PLLC

(57) ABSTRACT

An electrostatic inkjet ink composition including: a non-aqueous solvent having a dielectric constant of from 1.5 to 20 and a surface tension at 25° C. of from 15 to 60 mN/m; a color material that is insoluble in the non-aqueous solvent; and a charge control agent that is soluble in the non-aqueous solvent, wherein the charge control agent contains a half-aside maleic acid copolymer containing repeating units represented by the formulae (Ia) and (Ib) as defined herein.

3 Claims, 1 Drawing Sheet

ELECTROSTATIC INKJET INK COMPOSITION

FIELD OF THE INVENTION

The present invention relates to an ink composition to be provided for an electrostatic mode inkjet recording device of ejecting ink to form letters or images on a medium to be transferred such as recording paper and to an inkjet image forming method using the same. In particular, the invention relates to oily ink having long-tern charge stability with time.

BACKGROUND OF THE INVENTION

An inkjet recording method in which printing is carried out by ejecting ink on a recording medium to form recording dots occupies the interest as a non-impact recording method in which colorization is easy, and recording can be conducted directly on plain paper, and a variety of printers utilizing this system are put into practical use. The inkjet recording method includes an on-demand injection system and a continuous injection system and is described in, for example, Takeshi Agui, et al., *Real Color Hard Copy*, published by Sangyo Tosho Co., Ltd. (1993), Shin Ohno, *Non-Impact Printing—Technologies and Materials—*, published by CMC Publishing Co., Ltd. (1986), and Takeshi Amari, *Inkjet Printer—Technologies and Materials—*, published by CMC Publishing Co., Ltd. (1998). Further, the continuous type includes a recording system called an electrostatic system (for example, Sweet type and Hertz type); and the on-demand type includes recording system called a piezoelectric system, a shear mode piezoelectric system, and a thermal inkjet system.

As the on-demand type inkjet recording method, there are known systems called electrostatic acceleration type ink-jet or slit jet as described in, for example, Susumu Ichinose and Yuji Ohba, *Denshi Tsushin Gakkai Rombunshi*, Vol. J66-C (No. 1), page 47 (1983) and Tadayoshi Ohno and Mamoru Mizuguchi, *Gazo Denshi Gakkaishi*, Vol. 10 (No. 3), page 157 (1981). According to this system, a voltage is applied to a plurality of recording electrodes disposed opposite to a recording medium and counter electrodes disposed on the back side of the recording medium, an electrostatic force is allowed to act on ink supplied on the recording electrodes due to a potential difference generated between the both electrodes, thereby ejecting the ink on the recording medium. Specific embodiments thereof are disclosed in, for example, JP-A-56-170, JP-A-56-4467, and JP-A-57-151374. In this system, a long and narrow slit-like ink discharge port having a plurality of recording electrodes in the inner wall thereof is used in place of a nozzle in the conventional inkjet head, ink is supplied into this slit-like ink chamber, and a high voltage is selectively applied to these electrodes, thereby injecting the ink in the vicinity of the electrode to recording paper closely positioned to the slit, thereby conducting recording.

For those reasons, there is no fear as to ink clogging, and the constitution of the head is simple so that a reduction in manufacturing costs can be expected. Further, this system is a method useful for realizing a so-called longitudinal long head having a length such that the width direction of the recording medium can be covered over a wide range.

Examples of drop-on-demand type full-color recording head constituted of such an electrostatic acceleration type inkjet system are disclosed and reported in, for example, JP-A-58-215253 and *Denshi Tsushin Gakkai Rombunshi*, Vol. J68-C, 2, pp. 93–100 (1985).

In this electrostatic acceleration type inkjet head, oily inks having a dyestuff dissolved in an organic solvent are suitably used. Though constitutional materials of such inks are not disclosed in detail, according to examples seen in Denshi Tsushin Gakkai Rombunshi, Vol. J68-C, 2, pp. 93–100 (1985), inks having such physical property values that the volume resistivity (electric resistivity) is from $10^7$ to $10^8$ $\Omega \cdot cm$, the surface tension is 22 mN/m, and the viscosity of from 3.1 to 6.9 cP are used.

However, these oily inks have a low surface tension as compared with aqueous inks generally used in other ink-jet systems so that their permeability into recording paper is very large. Accordingly, in particular, there was encountered such a problem that in the case where printing is carried out on plain paper, a lowering in the printing density, blur, and offset are liable to occur.

On the other hand, an electrostatic system of a color material concentration discharge type without using a slit-like recording head is disclosed in JP-A-9-193389 and JP-A-138493. In this system, a plurality of individual electrodes for allowing an electrostatic force to act on a colorant component in ink are constituted of a control electrode substrate composed of an insulating substrate having a through-hole formed therein and a control electrode formed corresponding to the through-hole and a convex ink guide arranged in the substantially center position of the through-hole, the ink is carried on the surface of the convex ink guide to an ink droplet ejecting position by a surface tension, and a prescribed voltage is applied to the control electrode to eject ink droplets to a recording medium, thereby conducting recording.

In the electrostatic inkjet system of a color material concentration discharge type, particles of a color material are concentrated into the discharge section by electrophoresis, thereby ejecting the ink droplets in the state that the color material is concentrated in a high concentration. For that reason, different from the foregoing systems, in this electrostatic inkjet systems, the ink is not discharged in the state that a large quantity of the liquid component wherein constitutional components of the ink are uniformly present is contained but is discharged in the state that a mall quantity of the liquid component wherein the color material is agglomerated is contained, whereby the foregoing problems are solved. Also, by using a pigment as the color material, advantageous results are obtained with respect to water resistance and light fastness of printed images as compared with the conventional inkjet heads using a dyestuff.

In the electrostatic inkjet system of a color material concentration discharge type, for the sake of obtaining good printing characteristics such that the printing density is high and that blur and offset are not caused, first of all, it is required that the volume resistivity of ink be sufficiently large. In this way, it bees possible to allow an electric field applied to ink formed by recording electrodes and counter electrodes to reach particles of a color material. When the volume resistivity of the ink is low, the ink is subjected to charge injection by a voltage applied from the recording electrodes and electrically charged. Thus, a tendency that the ink is discharged in the state that a large quantity of the liquid component is contained due to an electrostatic repulsion becomes strong.

Next, it is required that the particles of color material be concentrated into a discharge section at a sufficient speed by electrophoresis. Accordingly, the particles of color material are required to have a sufficient charge amount, i.e., the particles of color material must have a particle electric conductivity with high positive polarity or negative polarity. Moreover, in view of the discharge performance and sedimentation prevention of the particles of color material, it is considered preferable that the particles of color material have a mean particle size of from about 0.1 to 4 µm.

Concretely, for example, JP-A-9-193389 discloses use of ink adjusted so as to have an electric resistivity of $10^8$ Ω·cm or more by dispersing particles of a developer (particles of a solid resin containing at least a colorant component) in a dielectric liquid having an electric resistivity of $10^{10}$ Ω·cm or more, the particles of developer having a zeta potential against the dielectric liquid of 60 mV or more and a mean particle size falling within the range of from 0.01 to 5 µm. Such ink can be, for example, prepared by preparing a color material dispersion using a system wherein a hydrocarbon based solvent having a volume resistivity of $10^{10}$ Ω·cm or more is used as an insulating liquid, carbon black or an organic pigment is used as the color material, a pigment is contained in or on the surface of a binder composed of a resin or wax, and a dispersant and a charge control agent such as a metallic soap are additionally added. However, JP-A-9-193389 does not disclose in detail the formation of the ink and the preparation method and adjustment method of physical property values of the ink. Also, there was encountered such a problem that it is difficult to hold the charge of the particles of color material stably over a long period of time.

Also, JP-A-2001-139856 discloses an electrostatic inkjet head ink containing a highly electrically insulating dispersion medium of an aliphatic hydrocarbon based solvent system, a color material insoluble in the dispersion medium, and an acrylic acid ester polymer soluble in the dispersion medium and a metallic soap as charge control agents and a method of controlling charge of a color material. According to JP-A-2001-139856, it is possible to impart a high zeta potential to the particles of color material by containing a combination of an acrylic acid ester polymer soluble in the dispersion medium and a metallic soap. However, there was encountered such a problem that it is difficult to hold the charge of particles of a color material (such as carbon black and organic pigments) stably over a long period of time. Though the mechanism of charge generation against carbon black or organic pigments dispersed in the aliphatic hydrocarbon based solvent is unclear in many points, it may be considered that in the case of a metallic soap, polarity control of the pigment is determined depending upon a selective adsorption model. That is, the oil-soluble metallic soap is dissociated, and the dissociated metal ion adsorbs on the pigment particle to give a positive charge. On the other hand, a counter ion forms a micellar structure together with the metallic soap, whereby it is stabilized an a negative charge in the dispersion. However, there was encountered such a problem that because of the charge generation mechanism based on adsorption equilibrium, it is likely affected by the environment such as water so that it is difficult to hold the charge of the pigment particles stably over a long period of time.

SUMMERY OF THE INVENTION

When demands of high speed and high image quality of printers increase, even in the foregoing inkjet heads of a color material concentration discharge type, technologies capable of printing images of higher definition at a high speed by discharging fine ink droplets in which a color material is concentrated in a high concentration stably over a long period of time and at a high speed are considered necessary.

It has already been confirmed that such printing performance largely depends upon physical property values of the ink. For the sake of obtaining sufficient printing performance, as mentioned in the section of the background art, in preparing ink, it is necessary to impart a high particle electric conductivity of 100 pS/cm or more to particles of a color material while keeping a high volume resistivity of preferably $10^8$ Ω·cm or more. If the particle electric conductivity of the particles of color material is less than 100 pS/m, it is impossible to move the particles of color material at a high speed into a discharge section, i.e., a tip portion of discharge electrode by electrophoresis. Thus, the supply of the particles of color material becomes insufficient, agglomeration of the particles of color material becomes worse, and a discharge response frequency becomes low.

Further, since an electric repulsion between the discharge electrode surface and the particle of color material is weak, there may be the case where stable discharge cannot be conducted due to adhesion and accumulation of the particles of color material on the discharge electrode. For those reasons, there is encountered such a problem that not only a sufficient printing density is not obtained, but also stable and high-speed printing cannot be conducted.

Accordingly, it is necessary to sufficiently electrically charge the color material in the ink by adding a metallic soap soluble in a dispersion medium, an ionic compound, or a surfactant as a charge control agent to a dispersion medium. However, as described previously, it is the present state that a useful method of imparting a sufficiently high particle electric conductivity to the particles of color material while meeting the requirements with respect to physical properties of the ink such as volume resistivity is hardly available, especially any useful method of holding the charge amount of the particles of color material stably over a long period of time has not been disclosed yet.

In order to solve the foregoing problems, the present inventors made extensive and intensive investigations about the charge control method of particles of a color material in ink without using an oil-soluble metallic soap. As a result, they have reached the invention.

The invention is to solve the foregoing problems of the related art and is aimed to provide ink for electrostatic inkjet head of a color material concentration discharge type capable of printing dots in a high concentration and with less blur at a high speed by imparting a high specific electric conductivity of positive polarity to particles of a color material in ink; to provide ink for electrostatic inkjet head of a color material concentration discharge type capable of conducting printing stably over a long period of time because the charge amount of the particles of color material can be held stably over a long period of time; and to provide an electrostatic inkjet image forming method using the same.

In order to solve the foregoing problem, the present inventors made extensive and intensive investigations. As a result, it has keen found that these problems can be solved by the following constitutions.

(1) An electrostatic inkjet ink composition containing as major components a non-aqueous solvent having a dielectric constant of from 1.5 to 20 and a surface tension at 25° C. of from 15 to 60 mN/m, a color material that is insoluble in the non-aqueous solvent, and a charge control agent that is soluble in the non-aqueous solvent, wherein the charge control agent contains a half-amide maleic acid copolymer containing repeating units represented by the following formulae. (Ia) and (Ib).

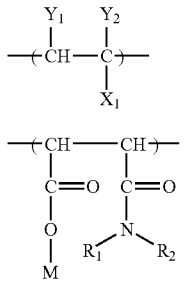

(Ia)

(Ib)

In the formulae, $X_1$ represents a hydrocarbon group having 10 or more carbon atoms in total; and $Y_1$ and $Y_2$ may be the same as or different from each other and each represents a hydrogen atom or an alkyl group. $R_1$ and $R_2$ may be the same as or different from each other and each represents a hydrogen atom, an aliphatic group, an alicyclic hydrocarbon group, an aromatic group, or a heterocyclic group. Also, $R_1$ and $R_2$ may be cyclized with a carbon atom, and the ring may contain a hetero atom. However, the total sum of carbon atoms contained in $X_1$, $R_1$, and $R_2$ is 14 or more. M represents a hydrogen atom, a metal atom, or an ammonium salt or quaternary salt of an organic base.

(2) An electrostatic inkjet ink composition containing as major components a non-aqueous solvent having a dielectric constant of from 1.5 to 20 and a surface tension at 25° C. of from 15 to 60 mN/m, a color material that is insoluble in the non-aqueous solvent, and a charge control agent that is soluble in the non-aqueous solvent, wherein the charge control agent contains a half-amide maleic acid copolymer containing repeating units represented by the following formulae (Ia') and (Ib).

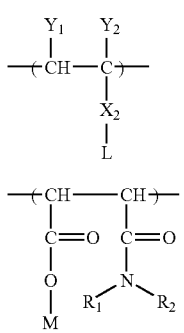

(Ia')

(Ib)

In the formulae, $X_2$ is a group connecting the main chain and an atomic group L and represents —O—, —CH$_2$OCO—, —OCO—, or —COO—; and L represents an aliphatic group. However, the total sum of carbon atoms contained in $X_2$ and L is 12 or more. $Y_1$ and $Y_2$ may be the same as or different from each other and each represents a hydrogen atom or an alkyl group. $R_1$ and $R_2$ may be the same as or different from each other and each represents a hydrogen atom, an aliphatic group, an alicyclic hydrocarbon group, an aromatic group, or a heterocyclic group. Also, $R_1$ and $R_2$ may be cyclized with a carbon atom, and the ring may contain a hetero atom. N represents a hydrogen atom, a metal atom, or an ammonium salt or quaternary salt of an organic base.

(3) An electrostatic inkjet ink composition containing as major components a non-aqueous solvent having a dielectric constant of from 1.5 to 20 and a surface tension at 25° C. of from 15 to 60 mN/m, a color material that is insoluble in the non-aqueous solvent, and a charge control agent that is soluble in the non-aqueous solvent, wherein the charge control agent contains a polymer (high-molecular confound) capable of being solubilized in the non-aqueous solvent, which is obtained by reacting a copolymer containing at least one monomer and maleic anhydride as constitutional units with a primary amino compound or a primary amino compound and a secondary amino group and which is a polymer containing a half-amide maleic acid component and a maleinimide component as repeating units.

(4) The electrostatic inkjet ink composition as set forth above in any one of (1) to (3), wherein the ink composition has a volume resistivity at 25° C. of $10^6$ Ω·cm or more, and particles of the color material in the ink composition have a particle electric conductivity of 100 pS/cm or more.

(5) A method of forming an electrostatic inkjet image comprising introducing an ink composition containing as major components a non-aqueous solvent having a dielectric constant of from 1.5 to 20 and a surface tension at 25° C. of from 15 to 60 mN/m, a color material that is insoluble in the non-aqueous solvent, and a charge control agent that is soluble in the non-aqueous solvent and contains a half-amide maleic acid copolymer containing repeating units represented by the following formulae (Ia) and (Ib), into a recording head having a plurality of recording electrodes disposed therein; applying a voltage to the recording electrodes to allow an electrostatic force to act on the ink, thereby ejecting ink droplets in the state that particles of the color material are concentrated; and forming print dots on a recording medium disposed opposite thereto.

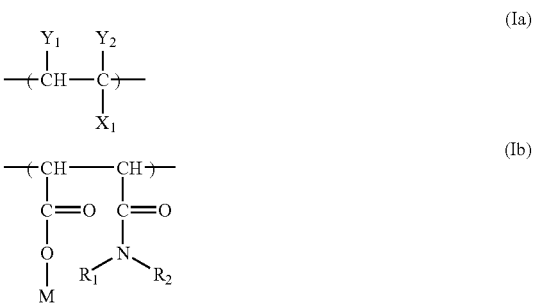

(Ia)

(Ib)

In the formulae, $X_1$ represents a hydrocarbon group having 10 or more carbon atoms in total; and $Y_1$ and $Y_2$ may be the same as or different from each other and each represents a hydrogen atom or an alkyl group. $R_1$ and $R_2$ may be the same as or different from each other and each represents a hydrogen atom, an aliphatic group, an alicyclic hydrocarbon group, an aromatic group, or a heterocyclic group. Also, $R_1$ and $R_2$ may be cyclized with a carbon atom, and the ring may contain a hetero atom. However, the total sum of carbon atoms contained in $X_1$, $R_1$, and $R_2$ is 14 or more. M represents a hydrogen atom, a metal atom, or an ammonium salt or quaternary salt of an organic base.

(6) A method of forming an electrostatic inkjet image comprising introducing an ink composition containing as major components a non-aqueous solvent having a dielectric constant of from 1.5 to 20 and a surface tension at 25° C. of from 15 to 60 mN/m, a color material that is insoluble in the non-aqueous solvent, and a charge control agent which is soluble in the non-aqueous solvent and contains a half-amide maleic acid copolymer containing repeating units represented by the following formulae (Ia') and (Ib), into a recording head having a plurality of recording electrodes disposed therein; applying a voltage to the recording electrodes to allow an electrostatic force to act on the ink, thereby ejecting ink droplets in the state that particles of the color material are concentrated; and forming print dots on a recording medium disposed opposite thereto.

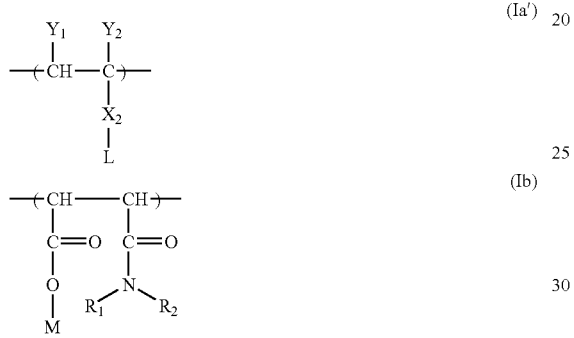

In the formulae, $X_2$ is a group connecting the main chain and an atomic group L and represents —O—, —$CH_2OCO$—, —OCO—, or —COO—; and L represents an aliphatic group. However, the total sum of carbon atoms contained in $X_2$ and L is 12 or more. $Y_1$ and $Y_2$ may be the same as or different from each other and each represents a hydrogen atom or an alkyl group. $R_1$ and $R_2$ may be the same as or different from each other and each represents a hydrogen atom, an aliphatic group, an alicyclic hydrocarbon group, an aromatic group, or a heterocyclic group. Also, $R_1$ and $R_2$ may be cyclized with a carbon atom, and the ring may contain a hetero atom. M represents a hydrogen atom, a metal atom, or an ammonium salt or quaternary salt of an organic base.

(7) A method of forming an electrostatic inkjet image comprising introducing an ink composition containing as major components a non-aqueous solvent having a dielectric constant of from 1.5 to 20 and a surface tension at 25° C. of from 15 to 60 mN/m, a color material that is insoluble in the non-aqueous solvent, and a charge control agent that is soluble in the non-aqueous solvent, the charge control agent containing a polymer capable of being solubilized in the non-aqueous solvent, which is obtained by reacting a copolymer containing at least one monomer and maleic anhydride as constitutional units with a primary amino compound or a primary amino compound and a secondary amino group and which is a polymer containing a half-amide maleic acid component and a maleinimide component as repeating units, into a recording head having a plurality of recording electrodes disposed therein; applying a voltage to the recording electrodes to allow an electrostatic force to act on the ink, thereby ejecting ink droplets in the state that particles of the color material are concentrated; and forming print dots on a recording medium disposed opposite thereto.

Also, preferred embodiments of the invention are as follows.

(8) An electrostatic inkjet ink composition of a color material concentration discharge type for introducing ink into a recording head having a plurality of recording electrodes disposed therein; applying a voltage to the recording electrodes to allow an electrostatic force to act on the ink, thereby ejecting ink droplets in the state that particles of a color material are concentrated; and forming print dots on a recording medium disposed opposite thereto, wherein the electrostatic inkjet ink composition contains as major components a non-aqueous solvent having a dielectric constant of from 1.5 to 20 and a surface tension at 25° C. of from 15 to 60 mN/m, a color material that is insoluble in the non-aqueous solvent, and a charge control agent that is soluble in the non-aqueous solvent, the charge control agent containing a half-amide maleic acid copolymer containing repeating units represented by the foregoing formulae (Ia) or (Ia') and (Ib), or a polymer capable of being solubilized in the non-aqueous solvent, which is obtained by reacting a copolymer containing at least one monomer and maleic anhydride as constitutional units with a primary amino compound or a primary amino compound and a secondary amino group and which is a polymer containing a half-amide maleic acid component and a maleinimide component as repeating units.

(9) The electrostatic inkjet ink composition as set forth above in (8), wherein the ink composition has a volume resistivity at 25° C. of $10^8$ Ω·cm or more, and the particles of color material in the ink composition have a particle electric conductivity of 100 pS/cm or more.

According to the invention, it is possible to realize ink for electrostatic inkjet ink head of a color material concentration discharge type in which particles of a color material have a high particle electric conductivity, and dots in a high concentration and with less blur can be stably printed at a high speed. Incidentally, the particle electric conductivity to show the charge amount of the particle of color material is a value obtained by subtracting a specific electric conductivity of a supernatant of the ink composition after centrifugation from a specific electric conductivity of the whole of the ink composition.

DETAILED DESCRIPTION OF THE INVENTION

Figure 1:
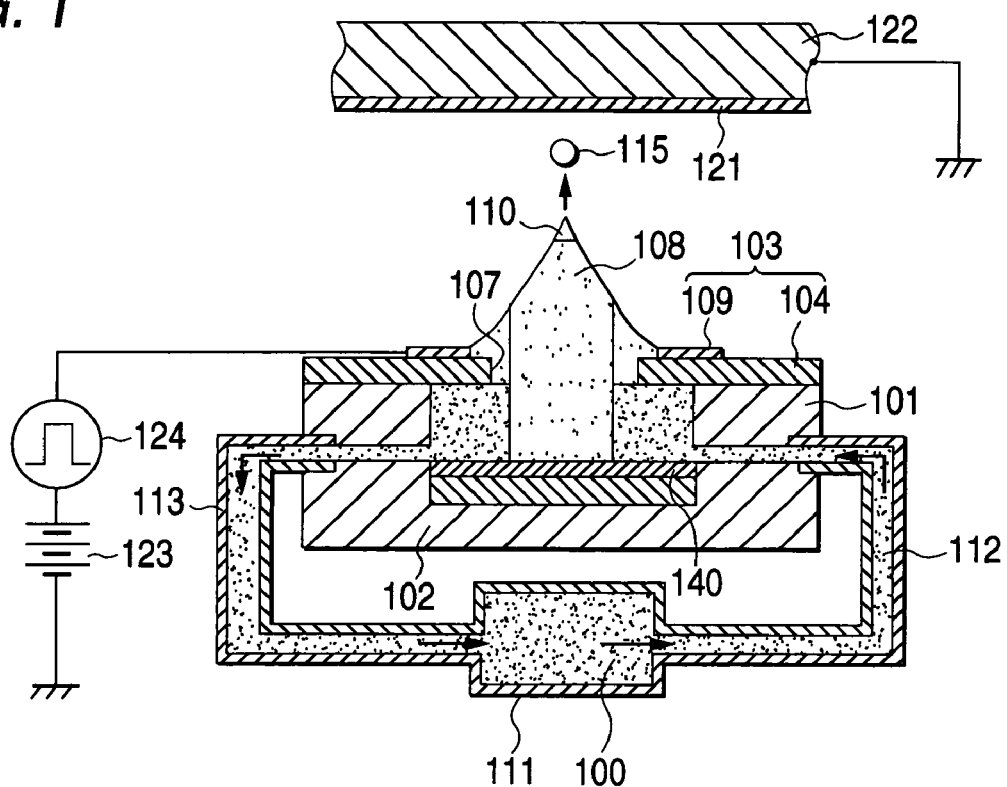
[FIG. 1] is a view showing the configuration of a line scanning type multichannel inkjet head and shows a cross-section of a discharge electrode corresponding to a recording dot.

The invention will be described below in detail.

The non-aqueous solvent having a dielectric constant of from 1.5 to 20 and a surface tension at 25° C. of from 15 to 60 mN/m, which is used in the invention, is required to have characteristics such as low toxicity, low flammability, and low odor. The non-aqueous solvent includes linear or branched aliphatic hydrocarbons, alicyclic hydrocarbons, aromatic hydrocarbons, petroleum naphthas, and halogen-substituted products thereof. Examples include hexane, octane, isooctane, decane, isodecane, decalin, nonane, dodecane, isododecane, Isopar E, IsoPar G, Isopar H and Isopar L (manufactured by Exxon), Solutol (manufactured by Phillips Oil), IP Solvent (manufactured by Idemitsu Petrochemical Co., Ltd.), and petroleum naphthas including S.B.R., Shellsol 70 and Shellsol 71 (manufactured by Shell Petrochemical) and Vegasol (manufactured by, Mobil Oil). These solvents can be used alone or in admixture.

The hydrocarbon solvents are preferably high-purity isoparaffinic hydrocarbons having a boiling point falling within the range of from 150 to 350° C. Examples of commercially available products include Isopar G, Isopar H, Isopar L, Isopar M and Isopar V (trade names, manufactured by Exxon Chemical), Norpar 12, Norpar 13 and Norpar 15 (trade names, manufactured by Exxon Chemical), XP Solvent 1620 and IP Solvent 2028 (trade names, manufactured by Idemitsu Petrochemical Co., Ltd.), Isosol 300 and Isosol 400 (trade names, manufactured by Nippon Petrochemicals), and Amsco OMS and Amsco 460 solvents (trade names, manufactured by Spirits Corp.). These products are an aliphatic saturated hydrocarbon having an extremely high purity and have a viscosity at 25° C. of not more than 3 cSt, a surface tension at 25° C. of from 22.5 to 28.0 mN/m, and a specific resistance at 25° C. of $10^{10}$ Ω·cm or more. Also, these products have such characteristic features such that they are stable due to low reactivity and that they are safe due to low toxicity and low in odor.

The halogen-substituted hydrocarbon solvents include fluorocarbon based solvents. Examples include perfluoroalkanes represented by $C_nF_{2n+2}$ such as $C_7F_{16}$ and $C_8F_{18}$ (for example, Fluorinert PF5080 and Fluorinert PF5070 (trade names, manufactured by Sumitomo 3M), fluorine based inert liquids (fox example, Fluorinert FC Series (trade names, manufactured by Sumitomo 3M)), fluorocarbons (for example, Krytox GPL Series (trade names, manufactured by DuPont Japan Ltd.)) fleons (for example, HCFC-141b (a trade name, manufactured by Daikin Industries, Ltd.), and iodinated fluorocarbons, for example, $F(CF_2)_4CH_2CH_2I$ and $F(CF_2)_6I$ (for example, I-1420 and I-1600 (trade names, manufactured by Daikin Fine Chemical Laboratory, Ltd.)).

As the non-aqueous solvent that is used in the invention, higher fatty acid esters and silicone oils can also be used. Specific examples of the silicone oils include low-viscosity synthetic dimethylpolysiloxanes. Examples of commercially available products thereof include KF96L (a trade name, manufactured by Shin-Etsu Silicone) and SH200 (a trade name, manufactured by Dow Corning Toray Silicone).

The silicone oils are not limited to these specific examples. As the dimethylpolysiloxanes, those having a very broad viscosity range are available depending on the molecular weight, but those having a viscosity in the range of from 1 to 20 cSt are preferably used. Similar to the isoparaffinic hydrocarbons, these dimethylpolysiloxanes have a volume resistivity of $10^{10}$ Ω·cm or more and have such characteristic features as high stability, high safety, and odorlessness. Also, these dimethylsiloxanes are characterized by a low surface tension and have a surface tension is from 18 to 21 mN/m.

Examples of solvents that can be mixed and used together with these organic solvents include alcohols (for example, methyl alcohol, ethyl alcohol, propyl alcohol, butyl alcohol, and a fluorinated alcohol), ketones (for example, acetone, methyl ethyl ketone, and cyclohexanone), carboxylic acid esters (for example, methyl acetate, ethyl acetate, propyl acetate, butyl acetate, methyl propionate, and ethyl propionate), ethers (for ale, diethyl ether, dipropyl ether, tetrahydrofuran, and dioxane), and halogenated hydrocarbons (for example, methylene dichloride, chloroform, carbon tetrachloride, dichloroethane, and methylchloroform).

Next, the color material that is used in the invention will be described below in detail.

The color material is not particularly limited but includes any generally commercially available organic pigments or inorganic pigments, pigments dispersed in a resin insoluble in a dispersion medium, and pigments on the surface of which is grafted a resin. Also, resin particles dyed with a dyestuff can be used.

As specific examples of organic pigments and inorganic pigments, those that exhibit yellow color include mono-azo pigments, for example, C.I. Pigment Yellow 1 (such as Fast Yellow G) and C.I. Pigment Yellow 74; dis-azo pigments, for example, C.I. Pigment Yellow 12 (such as Disazo Yellow AAA) and C.I. Pigment Yellow 17; non-benzidine based azo pigments, for example, C. Pigment Yellow 180; azo lake pigments, for example, C.I. Pigment Yellow 100 (such as Tartrazine Yellow Lake); condensed azo pigments, for example, C.I. Pigment Yellow 95 (such as Condensed Azo Yellow GR); acidic dye lake pigments, for example, C.I. Pigment Yellow 115 (such as Quinoline Yellow Lake); basic dye lake pigments, for example, C.I. Pigment Yellow 18 (such as Thioflavin Lake); anthraquinone based pigments, for example, Flavanthrone Yellow (Y-24); isoindolinone pigments, for example, Isoindolinone Yellow 3RLT Y-110); quinophthalone pigments, for example, Quinophthalone Yellow (Y-138); isoindoline pigments, for example, Isoindoline Yellow (Y-139); nitroso pigments, for example, C.I. Pigment Yellow 153 (such as Nickel Nitroso Yellow); and metal complex azomethine pigments, for example, C.I. Pigment Yellow 117 (such as Copper Azomethine Yellow).

Examples of pigments that exhibit magenta color include mono-azo based pigment, for example, C.I. Pigment Red 3 (such as Toluidine Red); dis-azo pigments, for example, C.I. Pigment Red 38 (such as Pyrazolone Red B); azo lake pigments, for example, C.I. Pigment Red 53:1 (such as Lake Red C) and C.I. Pigment Red 57:1 (such as Brilliant Carmine 6B); condensed azo pigments, for example, C.I. Pigment Red 144 (Condensed Azo Red BR); acidic dye lake pigments, for example, C.I. Pigment Red 174 (such as Phloxine B Lake); basic dye lake pigments, for example, C.I. Pigment Red 81 (such as Rhodamine 6G' Lake); anthraquinone based pigments, for example, C.I. Pigment Red 177 (such as Dianthraquinonyl Red); thioindigo pigments, for example, C.I. Pigment Red 88 (such as Thioindigo Bordeaux); perinone pigments, for example, C.I. Pigment Red 194 (such as Perinone Red); perylene pigments, for example, C.I. Pigment Red 149 (such as Perylene Scarlet); quinacridone pigments, for example, C.I. Pigment Red 122 (such as Quinacridone Magenta); isoindolinone pigments, for example, C.I. Pigment Red 180 (such as Isoindolinone Red 2BLT); and arizalin lake pigments, for example, C.I. Pigment Red 83 (Madder Lake).

Examples of pigments that exhibit cyan color include dis-azo based pigments, for example, C.I. Pigment Blue 25 (such as Dianisidine Blue); phthalocyanine pigments, for example, C. I. Pigment Blue 15 (such as Phthalocyanine Blue); acidic dye lake pigments, for example, C.I. Pigment Blue 24 (such as Peacock Blue Lake); basic dye lake pigments, for example, C.I. Pigment Blue 1 (such as Victoria Pure Blue BO Lake); anthraquinone based pigments, for example, C.I. Pigment Blue 60 (such as Indanthrone Blue): and alkali blue pigments, for example, C.I. Pigment Blue 18 (such as Alkali Blue V-5:1).

Examples of pigments that exhibit black color include organic pigments, for example, aniline black based pigments such as BK-1 (Aniline Black); iron oxide pigments; and carbon black pigments, for example, furnace black, lamp black, acetylene black, and channel black. Specific examples of carbon black pigments include MA-8, Ma-10, MA-11, M-100, MA-220, #25, #40, #260, #2600, #2700B, #3230B, CF-9, MA-100R, and Ma-200RB, all of which are manufactured by Mitsubishi Chemical Corporation: Printex 75 and Printex 90, all of which are manufactured by Degussa; and Monarch 800 and Monarch 1100 all of which are manufactured by Cabot Corp. Also, it may be considered to apply a metal powder for attaining color reproduction of gold, silver, copper, etc.

Besides, processed pigments comprising pigment fine particles dispersed in a rosin ester resin, a vinyl chloride-vinyl acetate resin, etc. are commercially available and may be used. Specific examples of commercially available processed pigments include Microlith pigments manufactured by Ciba Speciality Chemicals Corporation, and examples of preferred processed pigments include Microlith-T pigments comprising a rosin ester resin coated with a pigment.

The concentration of the color material in the ink of the invention is preferably in the range of from 0.5 to 20% by weight, and especially preferably from 2 to 15% by weight based on the total amount of the ink. When the concentration of the color material is 0.5% by weight or more, a sufficient printing density is obtained. Also, when the concentration of the color material is not more than 20% by weight, the ink can be stably discharged without causing an increase in the viscosity of the ink.

Next, the charge control agent that is a characteristic feature of the ink composition of the invention will be described in detail.

In the first embodiment of the ink composition of the invention, the charge control agent contains at least one half-amide, maleic acid copolymer containing repeating units represented by the following formulae (Ia) and (Ib).

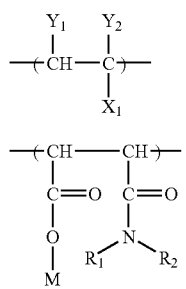

(Ia)

(Ib)

In the formulae, $X_1$ represents a hydrocarbon group having 10 or more carbon atoms in total; and $Y_1$ and $Y_2$ may be the same as or different from each other and each represents a hydrogen atom or an alkyl group. $R_1$ and $R_2$ may be the same as or different from each other and each represents a hydrogen atom, an aliphatic group, an alicyclic hydrocarbon group, an aromatic group, or a heterocyclic group. Also, $R_1$ and $R_2$ may be cyclized with a carbon atom, and the ring may contain a hetero atom. However, the total sum of carbon atoms contained in $X_1$, $R_1$, and $R_2$ is 14 or more. M represents a hydrogen atom, a metal atom, or an ammonium salt or quaternary salt of an organic base.

In the first embodiment of the invention, the charge control agent comprising a half-amide maleic acid copolymer is already known as an electrophotographic liquid developer as disclosed in JP-B-6-19596. However, JP-B-6-19596 describes charge control of a liquid developer in which vinyl acetate particles are dyed with Nigrosine, etc. but does not describe charge control of the particles of color material comprising a pigment the charge control of which is difficult due to a difference in the charge polarity as in the invention. Also, dyed latex particles in the electrophotographic liquid developer disclosed in Example 1 of JP-B-6-19596 have a low particle electric conductivity of 83 pS/cm, and therefore, in the case where such particles having a low particle electric conductivity are used an electrostatic type inkjet printer, even when a discharge voltage of the ink is increased, the resulting ink could not be used at all as electrostatic type inkjet ink.

The charge control agent in the first embodiment of the invention is characterized by containing at least one half-amide maleic acid copolymer containing repeating units represented by the foregoing formulae (Ia) and (Ib).

In the formula (Ia), $X_1$ preferably represents an optionally substituted alkyl group having from 10 to 30 carbon atoms in total (for example, a decyl group, a dodecyl group, a tetradecyl group, a hexadecyl group, an octadecyl group, a docosanyl group, a 10-methoxycarbonyloctamethylene group, and a 10-hexyloxycarbonyloctamethylene group); an optionally substituted aralkyl group having from 10 to 32 carbon atoms in total (for example, a 4-butylphenylmethyl group, a 4-methoxycarbonylphenylethyl group, and a 4-butoxycarbonylphenylmethyl group); an optionally substituted cycloalkane group having from 10 to 32 carbon atoms in total (for example, a 4-butylcyclohexyl group, a 4-octylcyclohexyl group, a 4-dodecylcyclohexyl group, a 3,5-dibutylcyclohexyl group, and a 3-hexylcyclooctyl group); or an optionally substituted aryl group having from 10 to 32 carbon atoms in total (for example, a 4-butylphenyl group, a 4-octylphenyl group, a 4-dodecylphenyl group, a 4-octyloxyphenyl group, and a 4-octyloxycarbonylphenyl group).

$Y_1$ and $X_2$ may be the same as or different from each other and preferably represents a hydrogen atom or a methyl group, and more preferably, both $Y_1$ and $Y_2$ represent a hydrogen atom, or either one of $Y_1$ and $Y_2$ represents a methyl group.

$R_1$ and $R_2$ may be the same as or different from each other and represents a hydrogen atom, an optionally substituted alkyl group having from 1 to 28 carbon atoms in total (for example, a methyl group, an ethyl group, a propyl group, a butyl group, a hexyl group, an octyl group, a 2-ethylhexyl group, a decyl group, a dodecyl group, a tetradecyl group, a hexadecyl group, an octadecyl group, a docosanyl group, a 3-methoxypropyl group, a 3-chloropropyl group, and a 2-cyanoethyl group), an optionally substituted aralkyl group having from 7 to 32 carbon atoms in total (for example, a benzyl group, a phenethyl group, a 4-chlorobenzyl group, a 4-butylbenzyl group, and a 4-methoxybenzyl group), an optionally substituted alkenyl group having from 2 to 32 carbon atoms in total (for example, an allyl group, a 2-pentenyl group, an isobutenyl group, a 2-decenyl group, and an oleyl group), an optionally substituted alicyclic hydrocarbon group having from 5 to 32 carbon atoms in total (for example, a cyclopentyl group and a cyclohexyl group), an optionally substituted aryl group having from 6 to 32 carbon atoms in total (for example, a phenyl group, a naphthyl group, a 2-chlorophenyl group, a 4-chlorophenyl group, a 4-methylphenyl group, a 4-methoxyphenyl group, a 4-butylphenyl group, a 4-octylphenyl group, and a 4-butoxyphenyl group), or an optionally substituted heterocyclic group having 5 or move atoms (for example, a furyl group). Further, $R_1$ and $R_2$ may be cyclized with a carbon atom, and the ring may contain a hetero atom (for example, a morpholine group and a piperidyl group).

M represents a hydrogen atom; a metal atom capable of forming a salt together with an organic carboxylic acid, such as an alkali metal (for example, sodium, potassium, and lithium), an alkaline earth metal (for example, barium, calcium, and aluminum), and a transition metal (for example, copper, iron, titanium, cobalt, and tin); or an ammonium salt or quaternary salt (for example, tetramethylammonium and trimethyldodecylammonium) of an organic base (for example, trimethylamine, dimethylamine, triethylamine, N,N-dimethylaniline, pyridine, and morpholine).

The formulation ratio of the components represented by the formulae (Ia) and (Ib) is preferably from 10/90 to 99.5/0.5, and more preferably from 70/30 to 30/70 on a weight basis.

In the invention, the molecular weight of the copolymer containing repeating units represented by the formulae (Ia) and (Ib) is from 1,000 to 500,000, and preferably 5,000 to 50,000.

In the first embodiment of the invention, the half-amide maleic acid copolymer containing repeating units represented by the formulae (Ia) and (Ib) can be produced by reacting a maleic anhydride copolymer containing repeating units represented by the following formulae (IIa) and (IIb) with an amino compound.

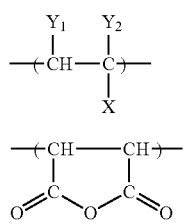

(IIa)

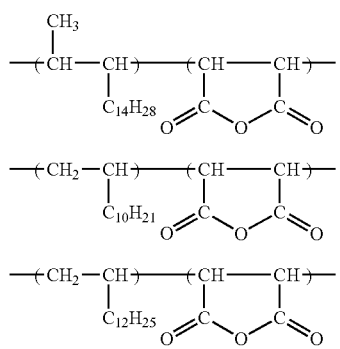

(IIb)

Here, in the formula (IIa), $X_1$, $Y_1$, and $Y_2$ are the same as in the foregoing formula (Ia).

The maleic anhydride copolymer containing repeating units represented by the foregoing formulae (IIa) and (IIb) can be produced according the conventionally known methods. For example, the details are described in Ryouhei Oda ed., *Kindai Kogyo Kagaku*, Vol. 16, *Kobunshi Kyogyo Kagaku I (First Volume)*, p. 281, published by Asakura Shoten; Ohtsu, et al., *Polymer Letters*, 2, 973 (1964); and M. M. Martin, *J. Org. Chem.*, 27, 1201 (1962). Some of specific examples thereof will be enumerate below.

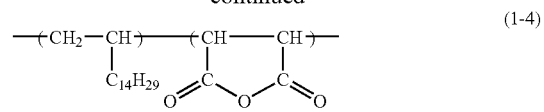

(1-1)

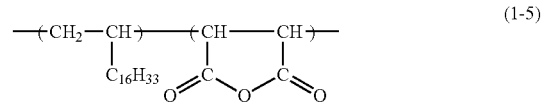

(1-2)

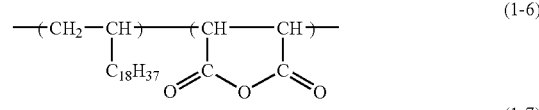

(1-3)

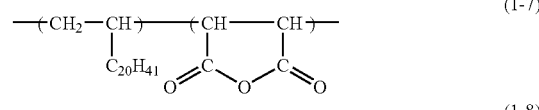

(1-4)

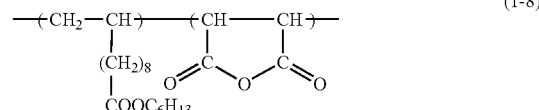

(1-5)

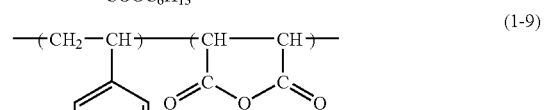

(1-6)

(1-7)

(1-8)

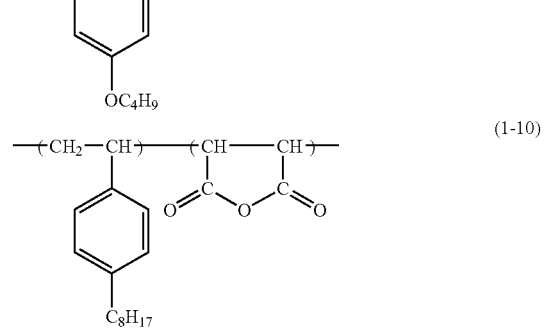

(1-9)

(1-10)

Examples of preferred compounds of the amino compound to be reacted with the maleic anhydride copolymer include butylamine, pentylamine, hexylamine, octylamine, decylamine, dodecylamine, tetradecylamine, hexadecylamine, octadecylamine, docosanylamine, 2-ethylhexaylamine, 3,3-dimethylpentylamine, allylamine, hexenylamine, dodecenylamine, tetradecenylamine, hexadecenylamine, octadecenylamine, and 2-nonyl-2-butenylamine.

The charge control agent that is used in the first embodiment of the invention is a reaction product between the foregoing maleic anhydride copolymer and a variety of amino compounds, which can be synthesized by applying reaction conditions in the conventional reaction between a low-molecular carboxylic anhydride and an amino compound, as described in *Shin-Jikken Kagaku Koza*, Vol. 14, page 1145, compiled by The Chemical Society of Japan (published by Maruzen Co., Ltd.).

That is, the carboxylic anhydride and the amino compound are mixed in an organic solvent that does not cause reaction with these compounds and that can dissolve the both therein at the reaction temperature described later [examples thereof include hydrocarbons (for example, decane, Isopar G, Isopar H, cyclohexane, benzene, toluene, and xylene), ketones (for example, methyl ethyl ketone and methyl isobutyl ketone), ethers (for example, dioxane, THF, and anisole), halogenated hydrocarbons (for example, chloroform, dichloroethylene, and methylchloroform), dimethylformamide, and dimethyl sulfoxide; these organic solvents may be used alone or in admixture] and reacted with each other at a temperature of from 20° C. to 200° C., and preferably form 25° C. to 150° C. for from 1 to 80 hours, and preferably from 3 to 15 hours.

Also, similar to the case of a low-molecular compound, the reaction is promoted by using a catalytic amount of an organic base (for example, triethylamine, dimethylaniline, pyridine, and morpholine) or an inorganic or organic acid (for example, sulfuric acid, methanesulfonic acid, and benzene-sulfonic acid).

The reaction product obtained from this reaction is a polymer (high-molecular compound) containing a half-amide maleic acid compound, resulted from the reaction between an acid anhydride in a polymer and an amino compound.

Specific examples of the copolymer compound according to the first embodiment of the invention will be enumerated below, but it should not be construed that the invention is limited thereto.

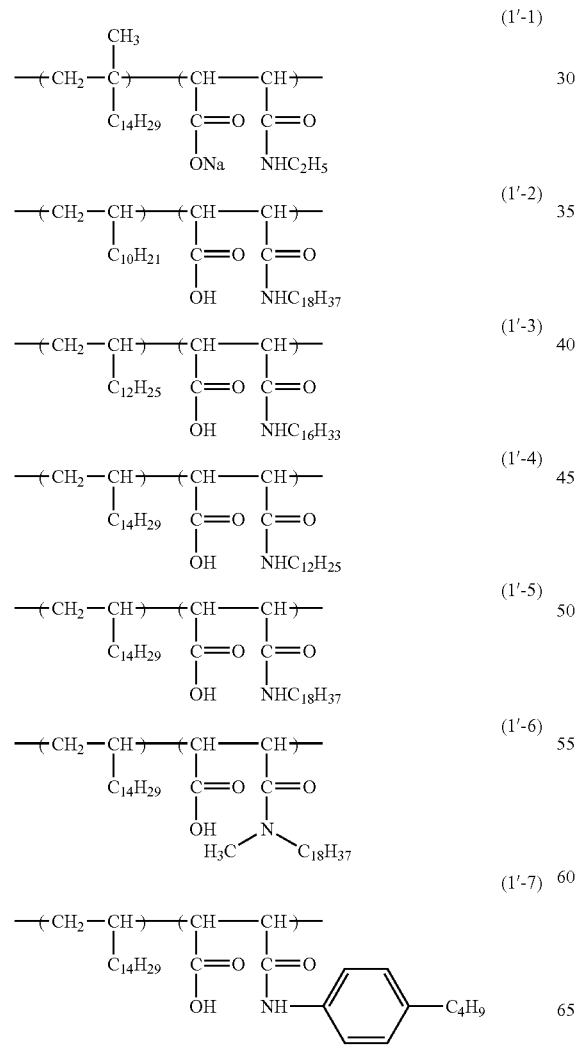

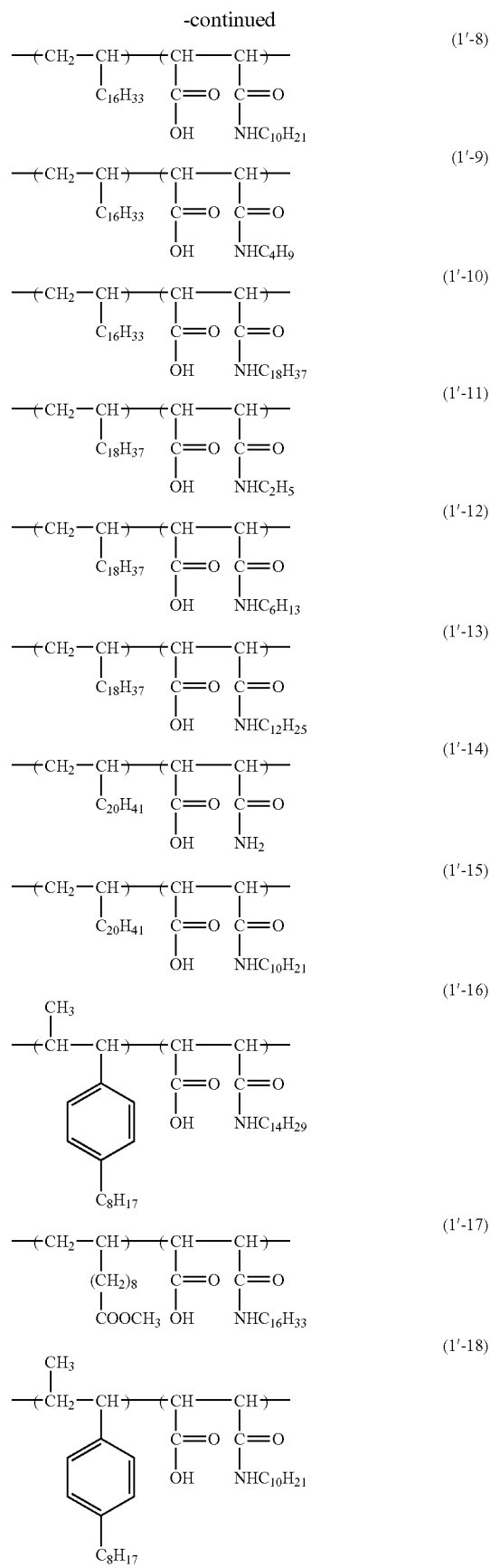

-continued

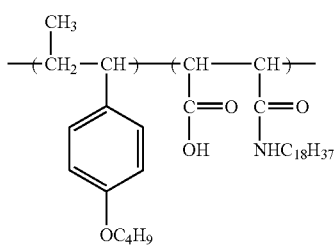

(1'-19)

Next, the charge control agent in the second embodiment of the invention will be described below in detail. The charge control agent in the second embodiment of the invention contains at least one half-amide maleic acid copolymer containing repeating units represented by the following formulae (Ia') and (Ib).

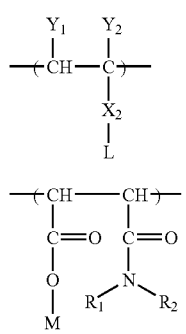

(Ia')

(Ib)

In the formula (Ia'), $X_2$ is a group connecting the main chain and an atomic group L and represents —O—, —CH$_2$OCO—, —OCO—, or —COO—; and L represents an aliphatic group. However, the total sum of carbon atoms contained in $X_2$ and L is 12 or more. $Y_1$ and $Y_2$ may be the same as or different from each other and each represents a hydrogen atom or an alkyl group.

In the second embodiment of the invention, the charge control agent comprising a half-amide maleic acid copolymer is already known as an electrophotographic liquid developer as disclosed in JP-B-6-19595. However, JP-B-6-19595 describes charge control of a liquid developer in which vinyl acetate particles are dyed with Nigrosine, etc. but does not describe charge control of the particles of color material comprising a pigment the charge control of which is difficult due to a difference in the charge polarity as in the invention. Also, dyed latex particles in the electrophotographic liquid developer disclosed in Example 1 of JP-B-6-19595 have a low particle electric conductivity of 85 pS/cm, and therefore, in the case where such particles having a low particle electric conductivity are used an electrostatic type inkjet printer, even when a discharge voltage of the ink is increased, the resulting ink could not be used at all as electrostatic type inkjet ink.

The charge control agent in the second embodiment of the invention is characterized by containing at least one half-amide maleic acid copolymer containing repeating units represented by the foregoing formulae (Ia') and (Ib).

In the formula (Ia'), L preferably represents an optionally substituted linear or branched alkyl group having from 10 to 32 carbon atoms in total (for example, a decyl group, an undecyl group, a dodecyl group, a tridecyl group, a tetradecyl group, a pentadecyl group, a hexadecyl group, a heptadecyl group, an octadecyl group, a nonadecyl group, an eicosanyl group, a docosanyl group, a 10-chlorodecyl group, a 10-(methoxycarbonyl)decyl group, a 7-chloropentadecyl group, and a 12-methoxydecyl group; these groups may be branched) or an optionally substituted linear or branched alkenyl group having from 10 to 32 carbon atoms in total (for example, a decenyl group, an undecenyl group, a dodecenyl group, a tridecenyl group, a tetradecenyl group, a pentadecenyl group, a hexadecenyl group, an oleyl group, a linoleyl group, an octadecenyl group, and an eicoasenyl group; these groups may be branched).

$Y_1$ and $Y_2$ may be the same as or different from each other and preferably represents a hydrogen atom or a methyl group, and more preferably, both $Y_1$ and $Y_2$ represent a hydrogen atom, or either one of $Y_1$ and $Y_2$ represents a methyl group.

The formulation ratio of the components represented by the formulae (Ia') and (Ib) is preferably from 10/90 to 99.5/0.5, and more preferably from 70/30 to 30/70 on a weight basis.

In the second embodiment of the invention, the molecular weight of the copolymer containing repeating units represented by the formulae (Ia') and (Ib) is from 1,000 to 500,000, and preferably 5,000 to 50,000.

The half-amide maleic acid copolymer containing repeating units represented by the formulae (Ia') and (Ib), which is a characteristic feature of the invention, can be produced by reacting a maleic anhydride copolymer containing repeating units represented by the following formulae (IIa') and (IIb) with an amino compound.

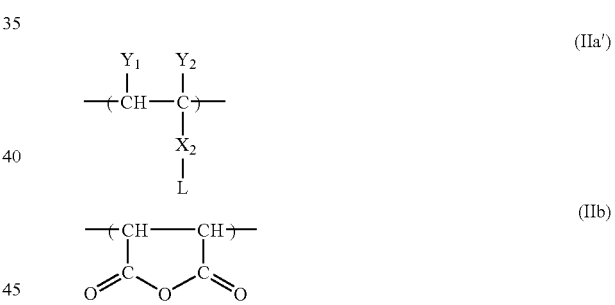

(IIa')

(IIb)

Here, in the formula (IIa'), $X_2$, $Y_1$, and $Y_2$ are the same as in the foregoing formula (Ia').

The maleic hydride copolymer containing repeating units represented by the foregoing formulae (IIa') and (IIb) can also be produced according the conventionally known methods. For example, the details are described in Ryouhei Oda ed., *Kindai Kogyo Kagaku*, Vol. 16, *Kobunshi Kyogyo Kagaku I (First Volume)*, p. 281, published by Asakura Shoten; Giichi Akazome, et al., *Kobunshi Kagaku* 17 (186), 618 (1960); Hidetoshi Tsuchida, et al., *Journal of the Society of Chemical Industry, Japan*, 70(4), 566 (1967); and J. Brandup, et al., *Polymer handbook, 2ndnd Edition*. Some of specific examples thereof will be enumerated below.

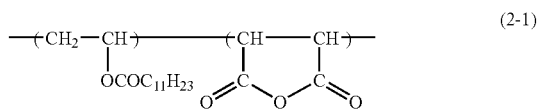

(2-1)

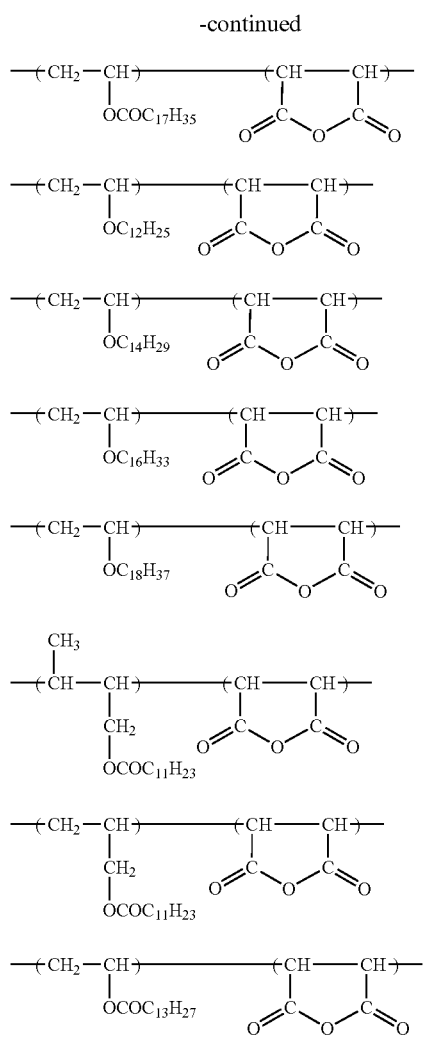

Examples of the amino compound to be reacted with the maleic anhydride copolymer include the same amino compounds enumerated above in the first embodiment.

The charge control agent that is used in the second embodiment of the invention can be synthesized in the same manner as in the foregoing first embodiment.

The reaction product obtained from this reaction is a polymer containing a half-amide maleic acid compound, resulted form the reaction between an acid anhydride in a polymer and an amino compound.

Specific examples of the copolymer compound according to the second embodiment of the invention will be enumerated bow, but it should not be construed that the invention is limited thereto.

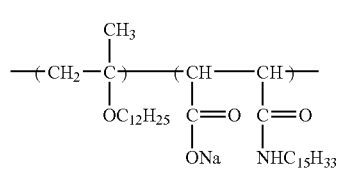

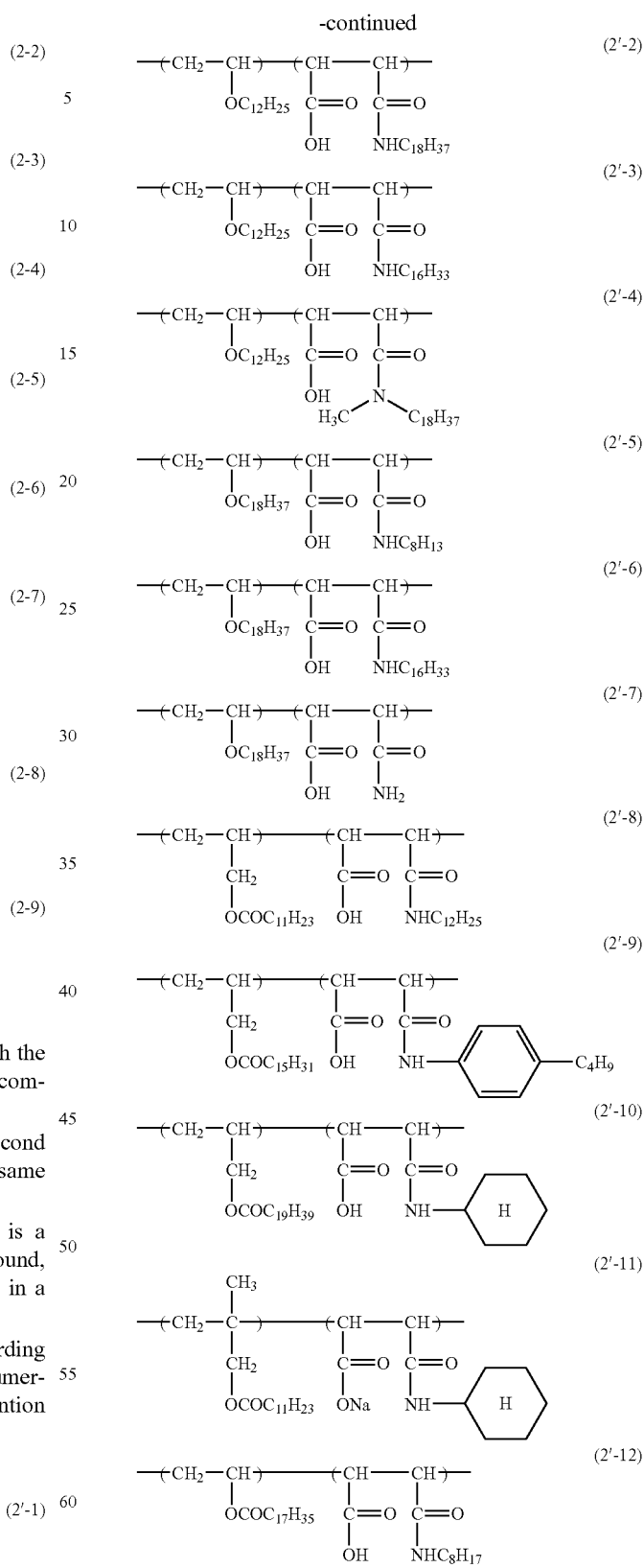

The charge control agent in the third embodiment of the invention is a polymer capable of being solibilized in the non-aqueous solvent, which is obtained by reacting a copolymer containing at least one monomer and maleic anhydride as constitutional units with a primary amino compound or a primary amino compound and a secondary amino group and which in a polymer containing a half-amide maleic acid component and a maleinimide component as repeating units.

In the third embodiment of the invention, the charge control agent comprising a half-amide maleic acid copolymer is already known as an electrophotographic liquid developer as disclosed in JP-B-6-23865. However, JP-B-6-23865 describes charge control of a liquid developer in which vinyl acetate particles are dyed with Nigrosine, etc. but does not describe charge control of the particles of color material comprising a pigment the charge control of which is difficult due to a difference in the charge polarity as in the invention. Also, dyed latex particles in the electrophotographic liquid developer disclosed in Example 1 of JP-B-6-23865 have a low particle electric conductivity of 81 pS/cm, and therefore, in the case where such particles having a low particle electric conductivity are used an electrostatic type inkjet printer, even when a discharge voltage of the ink is increased, the resulting ink could not be used at all as electrostatic type inkjet ink.

The charge control agent in the third embodiment of the invention is characterized in that it is a polymer capable of being solubilized in the non-aqueous solvent, which is obtained by reacting a copolymer containing at least one monomer and maleic anhydride as constitutional units with a primary amino compound or a primary amino compound and a secondary amino group and which is a polymer containing a half-amide maleic acid component and a maleinimide component as repeating units.

The monomer capable of forming a copolymer soluble in the non-aqueous solvent, which constitutes the copolymer to be used as the charge control agent in the third embodiment of the invention, includes polymerizable alkenes, cycloalkenes, styrenes, vinyl ethers, allyl ethers, carboxylic acid vinyl esters or allyl esters, and esters of unsaturated carboxylic acids such as methacrylic acid and acrylic acid. More specifically, examples of the monomer include optionally substituted alkenes having from 3 to 40 carbon atom in total (for example, propenylene, butene, vinylidene chloride, ω-phenyl-1-propene, allyl alcohol, hexene, octene, 2-ethylhexene, decene, dodecene, tetradecene, hexadecene, octadecene, docosene, eicosene, and hexyl 10-undecenoate); cyclolakenes having from 5 to 40 carbon atoms in total (for example, cyclopentene, cyclohexene, bicyclo[2,2,1]-heptene-2, and 5-cyanobicyclo[2,2,1]-heptene-2); optionally substituted styrenes having from 8 to 40 carbon atoms in total (for example, styrene, 4-methylstyrene, 4-n-octylstyrene, and 4-hexyloxystyrene); aliphatic group-substituted vinyl ethers or allyl ethers having from 1 to 40 carbon atoms in total [examples of the aliphatic group include an optionally substituted alkyl group (for example, a methyl group, an ethyl group, a butyl group, a hexyl group, an octyl group, a decyl group, a dodecyl group, a hexadecyl group, an octadecyl group, a docosanyl group, a chloroethyl group, a 2-ethylhexyl group, and a 4-methoxybutyl group), an optionally substituted aralkyl group (for example, a benzyl group and a phenethyl group), an optionally substituted cycloalkyl group (for example, a cyclopentyl group and a cyclohexyl group), and an optionally substituted: alkenyl group (for example, a 2-pentenyl group, a 4-propyl-2-pentenyl group, an oleyl group, and a linoleyl group)]; aromatic group-substituted vinyl ethers or allyl ethers having from 6 to 40 carbon atoms in total [examples of the aromatic group include a phenyl group, a 4-butoxyphenyl group, and a 4-octylphenyl group]; vinyl esters or allyl esters of optionally substituted aliphatic carboxylic acids having from 2 to 40 carbon atoms in total (for examples, esters of acetic acid, valeric acid, caproic acid, capric acid, lauric acid, myristic acid, palmitic acid, stearic acid, oleic acid, sorbic acid, and linoleic acid); vinyl esters or allyl esters of aromatic carboxylic acids having 6 or more carbon atoms in total (for example, esters of benzoic acid, 4-butylbenzoic acid, 2,4-butylbenzoic acid, and 4-hexyloxybenzoic acid); and optionally substituted aliphatic group esters of unsaturated carboxylic acids (for example, acrylic acid, methacrylic acid, maleic acid, and crotonic acid) (examples of the aliphatic group include a methyl group, an ethyl group, a propyl group, a hexyl group, a decyl group, a 2-hydroxyethyl group, and an N,N-dimethylaminoethyl group).

Specific examples of the copolymer containing such a monomer and maleic anhydride as constitutional units will be enumerated blow, but it should not be construed that the invention is limited thereto.

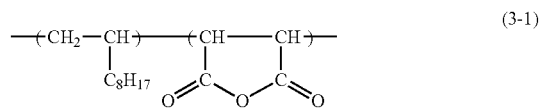

(3-1)

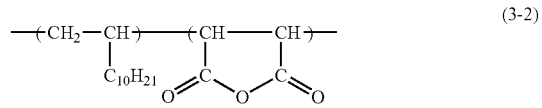

(3-2)

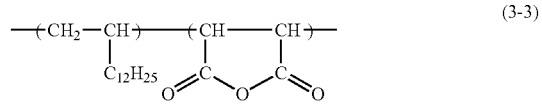

(3-3)

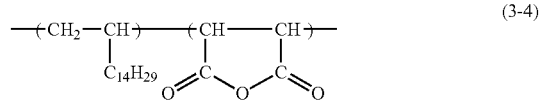

(3-4)

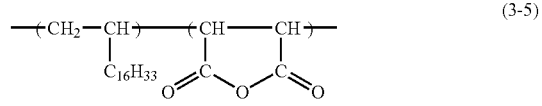

(3-5)

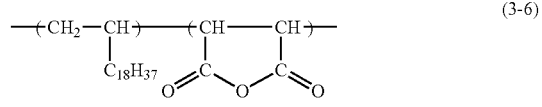

(3-6)

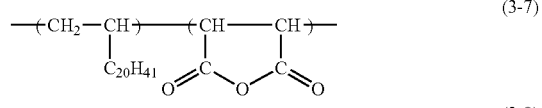

(3-7)

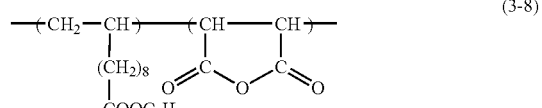

(3-8)

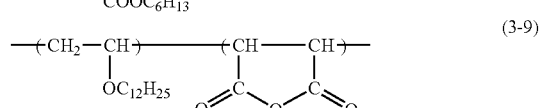

(3-9)

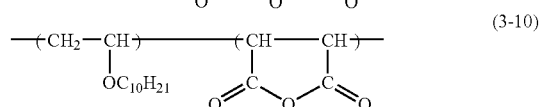

(3-10)

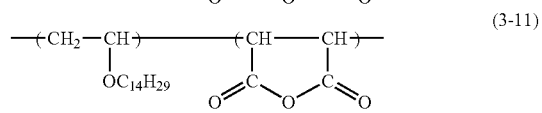

(3-11)

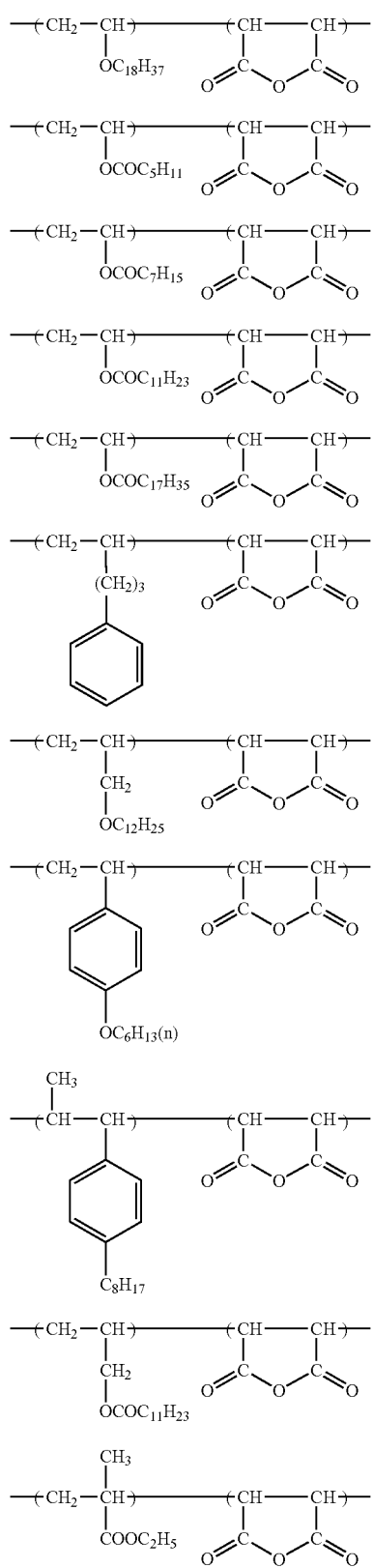

The copolymer containing maleic anhydride can be priced according the conventionally known methods. For example, the details are described in Ryouhei Oda ed., *Kindai Kogyo Kagaku*, Vol. 16, *Kobunshi Kyogyo Kagaku I* (*First Volume*); and known documents cited in Chapter 2, etc. of J. Brandrup, et al., *Polymer Handbook 2nd Edition*, John Wiley & Sons, New York.

The compound that is used as the charge control agent in the third embodiment of the invention is a reaction product between the foregoing copolymer containing maleic anhydride and an amino group.

As the amino compound, a primary amino compound represented by the following formula (I), or a primary amino compound represented by the following formula (I) and a secondary amino compound represented by the following formula (II) are used.

$R_1NH_2$            Formula (I)

$R_1R_2NH$          Formula (II)

In the formulae, $R_1$ and $R_2$ each represents an aliphatic group, an alicyclic hydrocarbon group, an aromatic group, or a heterocyclic group; and in the formula (II), $R_1$ and $R_2$ may be the same as or different from each other. Each of $R_1$ and $R_2$ preferably represents an optionally substituted alkyl group having from 1 to 32 carbon atoms (for example, a methyl group, an ethyl group, a propyl group, a butyl group, a hexyl group, an octyl group, a decyl group, a dodecyl group, a tetradecyl group, a hexadecyl group, an octadecyl group, a docosanyl group, a chloroethyl group, a cyanoethyl group, a 4-butoxypropyl group, a 2-ethylhexyl group, and an N,N-butylaminopropyl group); an optionally substituted alkenyl group having from 3 to 32 on atoms (for example, an allyl group, a 2-pentenyl group, a 4-propyl-2-pentenyl group, a decenyl group, an oleyl group, and a linoleyl group); an optionally substituted aralkyl group having form 7 to 36 carbon atoms (for example, a benzyl group and a phenethyl group); an optionally substituted alicyclic hydrocarbon group having from 5 to 32 carbon atoms (for example, a cyclopentyl group, a cyclohexyl group, a bicyclo [2,2,1,]-heptyl group, and a cyclohexecenyl group); an optionally substituted aryl group having from 6 to 38 carbon atoms (for example, a phenyl group, a tolyl group, a 4-butylphenyl group, a 4-decylphenyl group, and a 4-butoxyphenyl group); or a heterocyclic group having 5 or more atoms (for example, a furyl group and a thienyl group). In the case of the formula (II), $R_1$ and $R_2$ may be cyclized with a carbon atom, and the ring may contain a hetero atom (for example, a morpholyl group).

Specific examples of preferred amino compounds to be used in the third embodiment of the invention include ethylamine, propylamine, butylamine, pentylamine, hexylamine, octylamine, decylamine, dodecylamine, tetradecylamine, hexadecylamine, stearylamine, docosanylamine, 2-ethylhexylamine, 3,3-dimethylpentylamine, allylamine, hexecenylamine, dodecenylamine, tetradecenylamine, hexadecenylamine, octadecenylamine, 2-nonyl-2-butenylamine, allylamine, cyclohexylamine, benzylamine, and 4-n-octylaniline.

The polymer that is a reaction product between a copolymer containing a monomer and maleic anhydride an constitutional units and an amino compound, which is sued as the charge control agent in the third embodiment of the invention, is characterized by containing a half-amide maleic acid component and a maleinimide component. The compound of the invention can be easily produced by subjecting a maleic anhydride component in a polymer and a primary amino group to polymeric reaction to form a half-amide maleic acid copolymer and further to dehydration cyclization reaction, thereby converting a part of the half-amide maleic acid component into a maleinimide component.

That is, the carboxylic anhydride and the amino compound are mixed in an organic solvent that does not cause reaction with these compounds and that can dissolve the both therein at the reaction temperature described later [examples thereof include hydrocarbons (for example, decane, Isopar G, Isopar H, Shellsol 71, cyclohexane, benzene, toluene, and xylene), ketones (for example, methyl ethyl ketone and methyl isobutyl ketone), ethers (for example, dioxane, tetrahydrofuran, and anisole), halogenated hydrocarbons (for example, chloroform, dichloroethylene, and methylchloroform), dimethylformamide, and dimethyl sulfoxide; these organic solvents may be used alone or in admixture] and reacted with each other at a temperature of from 60° C. to 200° C., and preferably from 100° C. to 180° C. for from 1 to 80 hours, and preferably from 3 to 15 hours. Also, the reaction is promoted by using a catalytic amount of an organic base (for example, triethylamine, dimethylaniline, pyridine, and morpholine) or an inorganic or organic acid (for example, sulfuric acid, methanesulfonic acid, and benzenesulfonic acid). Alternatively, a usual dehydrating agent (for example, phosphorus pentoxide and dicyclocarboxydiimide) may be used in combination.

The reaction product obtained from the foregoing reaction is a polymer containing a half-amide maleic acid body and a maleinimide body in a pole as described above. The weight ratio of the half-amide maleic acid body to the maleinimide body to be contained is from 10/90 to 90/10, and preferably from 30/70 to 70/30. Also, the weight ratio of the monomer segment to the maleic anhydride segment capable of foxing a polymer soluble in the non-aqueous solvent, each of which constitutes a polymer, in from 10/90 to 99.5/0.5, and preferably from 70/30 to 30/70. The polymer has a molecular weight of from 1,000 to 500,000, and preferably from 5,000 to 50,000.

The concentration of the charge control agent in the invention is preferably in the range of from 0.0001 to 2.0% by weight based on the total amount of the ink. When the concentration of the charge control agent is 0.0001% by weight or more, an effect for imparting a high particle electric conductivity to the particles of color material is obtained. Also, when it is not more than 2.0% by weight, a sufficient printing density in obtained.

The basic constitutional components in the ink composition of the invention are those as described previously. Besides, in order to enhance dispersion upon mixing with the color material or fixing property of the color material, resins, pigment dispersants, surfactants, various additives, and the like may be properly added.

In the case where the pigment is dispersed in a resin that is insoluble in the dispersion medium, etc., various known natural or synthetic resins can be used as a binder resin. Examples thereof include acrylic resins, epoxy resins, polyester resins, ethylene-vinyl acetate resins, vinyl chloride-vinyl acetate resins, styrene-butadiene resins, and styrene-acrylic resins. As measures for dispersing the pigment in such a resin, various known methods as seen in the production process of electrophotographic toners may be employed. Besides, processed pigments comprising pigment fine particles dispersed in a rosin ester resin, a vinyl chloride-vinyl acetate resin, etc. are commercially available and may be used. Specific examples of commercially available processed pigments include Microlith pigments manufactured by Ciba Speciality Chemicals Corporation, and examples of preferred processed pigments include Microlith-T pigments comprising a rosin ester resin coated with a pigment.

As the resin, resins having a segment that solvates with a solvent, a segment that hardly solvates with a solvent, and a segment having a polar group are preferable for the sake of having such functions that they adsorb on a pigment dispersed in a resin insoluble in a dispersion medium and that they are well dispersed in a non-aqueous solvent. Examples of monomers that solvate with a solvent after polymerization include lauryl methacrylate, stearyl methacrylate, 2-ethylhexyl methacrylate, and cetyl methacrylate. Examples of monomers that hardly solvate with a solvent after polymerization include methyl methacrylate, ethyl methacrylate, isopropyl methacrylate, styrene, and vinyltoluene. Examples of monomers having a polar group include acid group-containing monomers such as acrylic acid, methacrylic acid, itaconic acid, fumaric acid, maleic acid, styrenesulfonic acid, and alkali metal salts thereof; and basic group-containing monomers such as dimethylaminoethyl methacrylate, diethylaminoethyl methacrylate, vinylpyridine, vinylpyrrolidine, vinylpiperidine, and vinyllactam.

With respect to the amounts of the pigment and the binder resin to be used, the binder resin is used in an amount of from 0.3 to 10 parts by weight, preferably from 0.4 to 7 parts by weight, and more preferably from 0.5 to 5 parts by weight based on part by weight of the pigment. When the amount of the binder resin to be used is 0.3 parts by weight or more based on part by weight of the pigment to be used, an effect for dispersing the pigment is obtained at the time of kneading. Also, when the amount of the binder resin to be used is not more than 10 parts by weight based on part by weight of the pigment to be used, a necessary image density is obtained without causing a large lowering in the pigment concentration in the ink composition.

As the pigment dispersant for dispersing the color material in the non-aqueous solvent, general pigment dispersants that are applied in the non-aqueous solvent can be used. As the pigment dispersant, those compatible with the foregoing non-polar insulating solvent and capable of stably dispersing the pigment into fine particles may be employed. Specific examples of the pigment dispersant include nonionic surfactants such as sorbitan fatty acid esters (for example, sorbitan monooleate, sorbitan monolaurate, sorbitan sesquinoleate, and sorbitan trioleate); polyoxyethylene sorbitan fatty acid esters (for example, polyoxyethylene sorbitan monostearate and polyoxyethylene sorbitan mono-oleate); polyethylene glycol fatty acid esters (for example, polyethylene glycol monostearate and polyethylene glycol diisostearate); polyoxyethylene alkylphenyl ethers (for example, polyoxyethylene nonylphenyl ether and polyoxyethylene octylphenyl ether); and aliphatic diethanolamides. Further, as high-molecular dispersants, polymers having a molecular weight of 1,000 or more are preferable. Examples thereof include styrene-maleic acid resins, styrene-acrylic resins, rosins, BYK-160, BYK-162, BYK-164 and BYK-182 (all of which are a urethane based polymer manufactured by BYK-Chemie), EFKA-47 and LP-4050 (all of which are a urethane based sipersant manufactured by EFKA), Solsperse 24000 (a polyester based polymer manufactured by Zeneca PLC), and Solsperse 1700 (an aliphatic diethanolamide based polymer manufactured by Zeneca PLC).

Other examples of the high-molecular pigment dispersant include random copolymers comprising a monomer that solvates with a solvent (for example, lauryl methacrylate, stearyl methacrylate, 2-ethylhexyl methacrylate, and cetyl methacrylate), a monomer that hardly solvates with a solvent (for example, ethyl methacrylate, ethyl methacrylate, isopropyl methacrylate, styrene, and vinyltoluene), and a polar group-containing segment; and graft copolymers disclosed in JP-A-3-188469. Examples of the foregoing polar group-containing monomer include acid group-containing monomers such as acrylic acid, methacrylic acid, itaconic acid, fumaric acid, maleic acid, styrenesulfonic acid, and alkali metal salts thereof; and basic group-containing monomers such as dimethylaminoethyl methacrylate, diethylaminoethyl methacrylate, vinylpyridine, vinylpyrrolidine, vinylpiperidine, and vinyllactam. Besides, sytrene-butadiene copolymers and block copolymers of styrene and a long chain alkyl methacrylate disclosed in JP-A-60-10263 are enumerated.

Preferred examples of the pigment dispersant include graft copolymers disclosed in JP-A-3-188469.

The amount of the pigment dispersant to be used is preferably from 0.1 to 300 parts by weight based on 100 parts by weight of the pigment. When the addition amount of the pigment dispersant falls within the foregoing range, a good effect for dispersing the pigment is obtained.

If desired, a variety of additives may be added to the ink composition of the invention. These additives are arbitrarily selected and contained in the ink composition according to the inkjet system or the material quality or structure of an inkjet discharge head, an ink supply section, or an ink circulation section. Additives described in, for example, *Inkjet Printer Technologies and Materials*, chapter 17, compiled by Takeshi Amari and published by CMC Publishing Co., Ltd. (1998) can be used.

Specific examples thereof include fatty acids (for example, monocarboxylic acids and polybasic acids each having from 6 to 32 carbon atom, such as 2-ethylhexylic acid, dodecenylsuccinic acid, butylsuccinic acid, 2-ethylcaproic acid, lauric acid, palmitic acid, elaidic acid, linolenic acid, recinoleic acid, oleic acid, stearic acid, enanthic acid, naphthenic acid, ethylenediaminetetraacetic acid, abietic acid, dehydroabietic acid, and hydrogenated rosin); metal salts of resin acids, alkylphthalic acids, alkylsalicylic acids, etc. (examples of metals of metal ions include Na, K, Li, B, Al, Ti, Ca, Pb, Mn, Co, Zn, Mg, Ce, Ag, Zr, Cu, Fe, and Ba); surface active compounds (for example, examples of organic phosphoric acids or salts thereof include mono-, di- or trialkylphosphoric acids comprising an alky group having from 3 to 18 carbon atoms and salts thereof; examples of organic sulfonic acids or salts thereof include long chain aliphatic sulfonic acids, long chain alkylbenzenesulfonic acids, dialyklsulfosuccinic acids, and salts thereof; and examples of ampholytic surface active compounds include phospholipids such as lecithin and cephalin); surfactants containing an alkyl group containing a fluorine atom and/or a dialkylsiloxane boding group; aliphatic alcohols (for example, higher alcohols comprising a branched alkyl group having from 9 to 20 carbon atoms, benzyl alcohol, phenethyl alcohol, and cyclohexyl alcohol); polyhydric alcohols {for example, alkylene glycols having from 2 to 18 carbon atoms (for example, ethylene glycol, 1,2-propylene glycol, 1,3-propylene glycol, 1,4-butanediol, neopentyl glycol, 1,6-hexanediol, and dodecanediol)}; alkylene ether glycols having from 4 to 1,000 carbon atoms (for example, diethylene glycol, triethylene glycol, dipropylene glycol, polyethylene glycol, polypropylene glycol, and polytetramethylene ether glycol); alicyclic diols having from 5 to 18 carbon atoms (for example, 1,4-cyclohexanedimethanol and hydrogenated bisphenol A); adducts of bisphenols having from 12 to 23 carbon atoms (for example, bisphenol A, bisphenol P, and bisphenol S) to alkylene oxides having from 2 to 18 carbon atoms (for example, ethylene oxide, propylene oxide, butylene oxide, and α-olefin oxides); polyols (for example, glycerin, trimethylolethane, trimethylolpropane, pentaerythritol, and sorbitol); phenols having a valency of from 3 to 8 or more (for example, trisphenol PA, phenol novolak, and cresol novolak); alkylene oxides adducts having from 2 to 18 carbon atoms of the foregoing polyphenols having a valency of 3 or more (the addition molar number is from 2 to 20); ether derivatives of the foregoing polyhydric alcohols (for example, polyglycol alkyl ethers and alkylalryl polyglycol ethers); fatty acid ester derivatives of polyhydric alcohols; ether oleate derivatives of polyhydric alcohols (for example, ethylene glycol monoethyl acetate, diethylene glycol monobutyl acetate, propylene glycol monobutyl propionate, and sorbitan monomethyl dioxanolate); alkylnaphthalene sulfonates; and alkylaryl sulfonates.

It is preferable to use a variety of additives so as to adjust the use amount such that the ink composition has a surface tension at 25° C. in the range of from 15 to 60 mN/m and a viscosity in the range of from 1.0 to 40 cP.

Next, the preparation method of the ink will be described below. In preparing the ink, general measures that are known as the preparation method of various pigment inks can be used. For example, there is a method in which a color material, a resin, a charge control agent as a characteristic feature of the invention, and other auxiliary additives, each of which is weighed in a prescribed compounding ratio, are mixed with a dispersion medium so as to have an appropriate viscosity range; the mixture is mixed and pulverized for from several hours to several tens hours using a dispersion machine such as a bead mill, an attritor, and a ball mill, to prepare a concentrated ink liquid in which the color material having a particle size of from about several tens nm to several μm is dispersed, and the concentrated ink liquid is diluted with a dispersion medium to a prescribed concentration at the time of use, to prepare an ink composition having a surface tension of from 15 to 60 mN/m and a viscosity of from 1.0 to 40 cP. Also, there is a method in which a color material, a resin, and auxiliary additives are mixed and melt kneaded at a temperature of the softening point of the resin or higher using a kneading machine such as a roll mill, a Banbury mixer, and a kneader; after cooling and pulverizing, the resulting mixture is dispersed and diluted in the same manner as described previously, to which is then added a charge control agent as a characteristic feature of the invention. The same effects can be obtained using any of these methods.

In the ink composition, the particles of color material coated with a resin preferably have a mean particle size in the range of from about 0.1 to 4 μm, and more preferably from 0.3 to 2 μm in view of the discharge performance and prevention of the particles of color material from sedimentation.

In the following embodiments, how the ink composition using the charge control agent of the invention is useful as ink for electrostatic type inkjet recording device will be described. Any electrostatic type inkjet printer can be applied without particular limitations in terms of the system so far as it uses ink using particles of a color material. As a preferred embodiment, an electrostatic inkjet printer of a color material concentration discharge type is enumerated.

An electrostatic inkjet printer of a color material concentration discharge type will be further described below.

Figure 2:
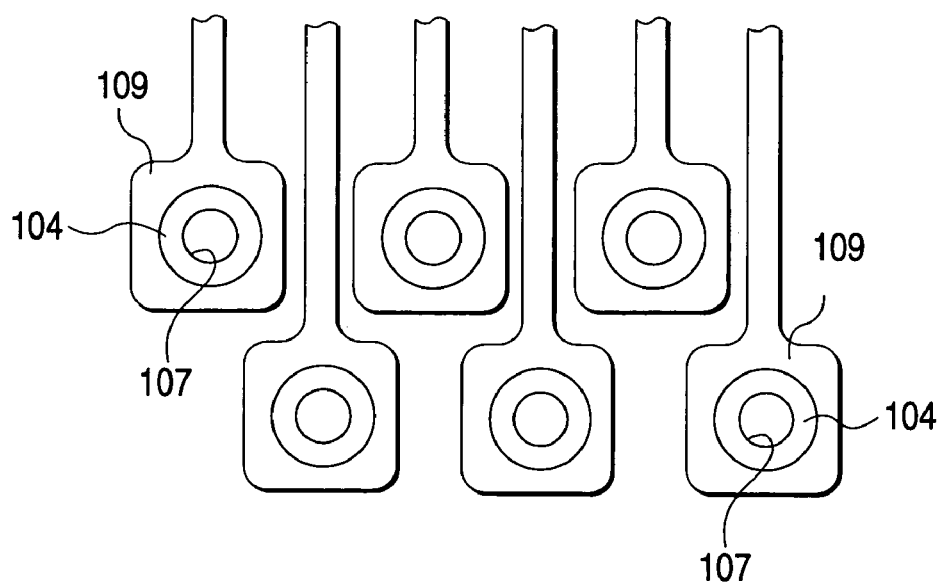
[FIG. 2] is a view of a discharge electrode substrate seeing from the side of a recording medium.

FIGS. 1 and 2 are schematic views showing an embodiment of a discharge head. FIG. 1 is a view showing the configuration of a line scanning type multichannel inkjet head and shows a cross-section of a discharge electrode corresponding to a recording dot. In FIG. 1, ink 100 is supplied between a head substrate 102 and a discharge electrode substrate 103 through an ink supply passage 112 connected to a head block 101 from a circulation mechanism 111 including a pump and recovered in the ink circulation mechanism 111 through an ink recovery passage 113 formed in the head block 101. The discharge electrode substrate 103 is constituted of an insulating substrate 104 having a through-hole 107 and a discharge electrode 109 formed around the through-hole 107 in the side of a recording medium. On the other hand, a convex ink guide 108 is disposed approximately in the center of the through-hole 107 on the head substrate 102. The convex ink guide 108 is made of an insulating Seizes such as plastic resins and ceramics. Each convex ink guide 108 is disposed at the line spacing and pitch so that the center thereof is coincident with the center of each through-hole 107, and kept on the head substrate 102 by the prescribed method. Each convex ink guide 108 has a shape such that a tip of flat plate having a fixed thickness is cut into a triangular or trapezoidal shape, and the tip section thereof forms an ink droplet ejecting position 110. Each convex ink guide 108 may form a slit-like groove from its tip section, and ink supply into the ink droplet ejecting position 110 is smoothly conducted by capillarity of the slit, whereby the recording frequency can be enhanced. Also, an arbitrary surface of the ink guide may have conductivity, if desired. In that case, by making the conductive portion in an electrically floating state, it is possible to effectively for an electric field at the ink ejecting position by applying a low voltage to the discharge electrode. Each convex ink guide 108 protrudes approximately vertically from the corresponding through-hole by a prescribed distance in the direction of ink droplet ejection. A recording medium 121 as recording paper is disposed opposite to the tip of the convex ink guide 108, and a counter electrode 122 functioning also as a role of a platen guiding the recording tedium 121 is disposed on the back surface of the recording medium 121 in relation to the head substrate 102. Also, a migration electrode 140 is formed in the bottom portion of a space formed by the head substrate 102 and the discharge electrode substrate 103. By applying a prescribed voltage thereto, the charged particles in the ink are subjected to electrophoresis in the direction of discharge position of the ink guide, whereby responsibility of discharge can be enhanced.

Next, a specific example of the configuration of the discharge electrode substrate 103 will be described with reference to FIG. 2. FIG. 2 is a view of the discharge electrode substrate 103 seeing from the side of the recording medium 121, in which a plurality of discharge electrodes are aligned in two lines in an array form in the main scanning direction, the through-hole 107 is formed in the center of each discharge electrode, and the individual discharge electrode 109 is formed around the through-hole 107. In this embodiment, the inner diameter of the discharge electrode 109 is larger than the diameter of the through-hole 107, but it may be equal to the diameter of the through-hole 107. Here, the insulating substrate 104 is made of a polyimide having a thickness of from about 25 to 200 µm, the discharge electrode 109 is made of a copper foil having a thickness of from about 10 to 100 µm, and the inner diameter of the through-hole 107 is from about 50 to 250 µm.

Next, recording action of an inkjet recording device of the electrostatic system will be described below. Here, an embodiment where ink containing a positively charged color material is used will be described, but it should not be construed that the invention is limited thereto. At the time of recording, the ink 100 supplied from the ink circulation mechanism 111 through the ink supply passage 112 is supplied into the ink droplet ejecting position 110 of the tip of the convex ink guide 108 through the through-hole 107, a part of the ink 100 is recovered in the ink circulation mechanism 111 through the ink recovery passage 113. Here, a voltage of, for example, +1.5 V as a continuous bias is applied to the discharge electrode 109 from a bias voltage source 123, and when turning on, a pulse voltage of, for ale, +500 V as a signal voltage corresponding to an image signal from a signal voltage source 124 is superimposed to the discharge electrode 109. Also, during this period of time, a voltage of +1.8 kV is applied to the migration electrode 140. On the other hand, the counter electrode 122 provided on the back side of the recording medium 121 is set up at a ground voltage of 0 V as shown in FIG. 1. If desired, the side of the recording medium 121 may be charged, for example, at −1.5 kV for applying a bias voltage. In that case, an insulating layer is provided on the surface of the counter electrode 122, the recording medium is charged by a corona discharger, a scorotron charger, a solid ion generator, etc., the discharge electrode 109 is, for example, grounded, and when turning on, a pulse voltage of for example, +500 V as a signal voltage corresponding to an image signal from the signal voltage source 124 is superimposed to the discharge electrode 109. Also, during this period of time, a voltage of +200 V is applied to the migration electrode 140. When the discharge electrode 109 is in the turn-on state (in the state where 500 V is applied), and a voltage of 2 kV in total (the pulse voltage of 500 V is superimposed to the bias voltage of 1.5 kV) is applied, an ink droplet 115 is ejected from the ink droplet ejecting position 110 of the tip of the convex ink guide 108, is drawn in the direction of the counter electrode 122, and reaches the recording medium 121 to form an image.

Incidentally, for precisely controlling ejection of the ink droplets after ejection to enhance dot placement accuracy on the recording medium, there are often taken measures, for example, provision of an intermediate electrode between the discharge electrode and the recording medium and provision of a guard electrode for suppressing electric field interference between the discharge electrodes. However, in this embodiment, as a matter of course, such measures are suitably employable, if desired. Also, a porous body may be provided between the head substrate 102 and the discharge electrode substrate 103. In that case, not only influence by a change of ink inner pressure due to movement of the inkjet head, etc. can be prevented, but also supply of the ink liquid into the through-hole 107 after discharge of ink droplets can be rapidly achieved. Accordingly, ejection of the ink droplet 115 is stabilized, whereby a good image having a uniform density can be recorded at a high speed on the recording medium 121.

EXAMPLES

The invention will be described below with reference to the following Examples, but it should not be construed that the invention is limited thereto.

[Synthesis of Maleic Anhydride-Containing Copolymer (Intermediate)]

Intermediate Preparation Example 1

Intermediate Illustrative Compound (1-2)

A mixture of 98 g of maleic anhydride, 252 g of 1-dodecene and 816 g of toluene was heated at a temperature of 85° C. with stirring in a nitrogen atmosphere. At that temperature, 6.0 g of benzoyl peroxide as an initiator was added, and the mixture was stirred for 3 hours. Further, 6.0 g of benzoyl peroxide was added, and the mixture was stirred for 4 hours. The resulting polymer solution had a solids content of 22.5%.

Intermediate Preparation Example 2

Intermediate Illustrative Compound (1-4)

A mixture of 49 g of maleic anhydride, 152 g of 1-hexadecene and 494 g of toluene was heated at a temperature of 90° C. with stirring in a nitrogen atmosphere. At that temperature, 3.50 g of benzoyl peroxide was added, and the mixture was stirred for 3 hours. Further, 3.5 g of benzoyl peroxide was added, and the mixture was stirred for 4 hours. The resulting poly solution had a solids content of 24.8%.

Intermediate Preparation Example 3

Intermediate Illustrative Compound (1-5)

A mixture of 98 g of maleic anhydride, 378 g of 1-octadecene and 1,850 g of toluene was heated at a temperature of 90° C. with stirring in a nitrogen atmosphere. At that temperature, 7.0 g of benzoyl peroxide was added, and the mixture was stirred for 3 hours. Further, 7.0 g of benzoyl peroxide was added, and the mixture was stirred for 5 hours. The resulting polymer solution had a solids content of 14.8%.

[Synthesis of Half-Amide Maleic Acid-Containing Copolymer (Compound of the Invention)]

Compound Preparation Example 1

Illustrative Compound (1'-2) of the Invention

A mixture of 100 g of the polymer solution obtained in Intermediate Preparation Example 1, 23.2 g of n-octadeylamine and 2 g of pyridine was stirred at a temperature of 70° C. for 8 hours. After cooling, the reaction mixture was added in 800 mL of methanol with stirring over 15 minutes, and the mixture was further stirred at that temperature for one hour. A precipitated solid was collected by filtration and dried in vacuo to obtain 37 g of a pale whitish yellow solid. The resulting compound had a molecular weight measured by high-performance liquid chromatography of 11,000.

Compound Preparation Example 2

Illustrative Compound (1'-6) of the Invention

A mixture of 100 g of the polymer solution obtained in Intermediate Preparation Example 2, 25 g of N-methyl-n-octadecyalmine 1.8 g of N,N-dimethylaniline and 25 g of toluene was stirred at a temperature of 100° C. for 15 hours. After cooling, the reaction mixture was added in one liter of methanol with stirring over 15 minutes, and the mixture was further stirred at that temperature for one hour. A deposited solid was collected by filtration and dried in vacuo to obtain 35 g of a pale whitish yellow solid. The resulting compound had a molecular weight measured by high-performance liquid chromatography of 11,000.

Compound Preparation Example 3

Illustrative Compound (1'-9) of the Invention

A mixture of 100 g of the polymer solution obtained in Intermediate, Preparation Example 3, 3.1 g of n-butylamine and 0.5 g of pyridine was stirred at a temperature of 50° C. for 50 hours. After cooling, the reaction mixture was added in 800 mL of methanol with stirring over 15 minutes, and the mixture was further stirred at that temperature for one hour. A deposited solid was collected by filtration and dried in vacuo to obtain 15 g of a pale whitish yellow solid. The resulting compound had a molecular weight measured by high-performance liquid chromatography of 7,500.

Compound Preparation Example 4

Illustrative Compound (1'-10) of the Invention

A mixture of 100 g of the polymer solution obtained in Intermediate Preparation Example 3, 10.2 g of n-octadecylamine and 2 g of pyridine was stirred at a temperature of 70° C. for 10 hours. After cooling, the reaction mixture was added in one liter of methanol with stirring over 15 minutes, and the mixture was further stirred at that temperature for one hour. A deposited solid was collected by filtration and dried in vacuo to obtain 21 g of a pale whitish yellow solid. The resulting compound had a molecular weight measured by high-performance liquid chromatography of 7,500.

Example 1

<Preparation of Ink Composition (IJ-1)>

One hundred parts by weight of Lionol Blue FG-7350 (Pigment Blue 15:3, manufactured by Toyo Ink Mfg. Co., Ltd.) as a blue pigment and 200 parts by weight of a styrene/vinyltoluene/lauryl methacrylate/trimethylammoniumethyl methacrylate (anion: p-toluenesulfonic acid) copolymer (molar ratio: 47/47/1/5) as a resin were previously pulverized and well mixed in a trio blender, and the mixture was melt kneaded (for 120 minutes) in a bench-top kneader PBV (manufactured by Irie Shokai Co., Ltd.) heated at 100° C. The kneaded pigment mixture was further pulverized in a pin mill. Next, 20 parts by weight of the resulting kneaded pigment mixture, 130 parts by weight of Isopar G, and 50 parts by weight of a 20 wt % solution prepared by dissolving Pigment Dispersant D-1 having the following structure in Isopar G by heating were mixed together with 400 parts by weight of 3G-X glass beads in a paint shaker (manufactured by Toyo Seiki Co., Ltd.) for 120 minutes. The volume average particle size of pigment particles in the resulting dispersion was measured by an ultracentrifugal automatic particle size distribution analyzer CAPA700 (manufactured by Horiba, Ltd.). As a result, it was found to be 0.45 μm.

Pigment Dispersant D-1

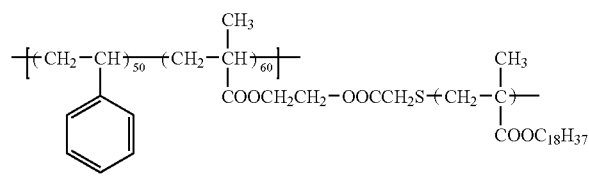

The copolymerization ratio is a weight ratio.

The foregoing dispersion of pigment resin particles from which the glass beads had been removed by filtration was diluted with Isopar G such that the concentration of the pigment resin particle component was 3.5%. Next, Illustrative Compound (1'-2) of the invention as a charge control agent was added such that its content was 0.002 wt %, to prepare Ink Composition (IJ-1). The resulting ink composition had a viscosity of 1.4 cP (measured at a temperature of 25° C. using an E type viscometer) and a surface tension of 23 mN/m (measured at a temperature of 25° C. using an automatic surface tensiometer manufactured by Kyowa Interface Science Co., Ltd.). Also, the charge amount of the ink composition was determined from a specific electric conductivity measured under conditions of an applied voltage of 5 V and a frequency of 1 kHz using an LCR meter (AG-4311, manufactured by Ando Electric Co., Ltd.) and an electrode for liquid (Model LP-05, manufactured by Kawaguchi Electric Works Co., Ltd.). The particle electric conductivity of the pigment resin particle was determined by subtracting a specific electric conductivity of a supernatant of the ink composition after centrifugation from a specific electric conductivity of the whole of the ink composition. Also, the centrifugation was conducted for 30 minutes under conditions of a rotation number of 14,500 rpm and a temperature of 23° C. using a small-sized high-speed refrigerated centrifuge (SRX-201, manufactured by Tony Seiko Co., Ltd.). The Ink Composition (IJ-1) exhibited a specific electric conductivity of 536 pS/cm as a whole. Also, the blue resin particles exhibiting distinct positive charge property exhibited a particle electric conductivity of 477 pS/cm, and 80% or more of the charge amount of the ink composition was applied to the pigment resin particles. After forced elapsing at 45° C. for one week, the specific electric conductivity of the ink composition was 510 pS/cm, and the particle electric conductivity of the pigment resin particle was 463 pS/cm, respectively. Thus, it was noted that the charge amount did not substantially change and was extremely stable.

<Image Drawing Property>

An inkjet device equipped with 64-channel (100 dpi) electrostatic type inkjet heads having the structure as shown in FIG. 1 was used, and the Ink Composition (IJ-1) was charged in an ink tank thereof. After removing dusts on the surface of coated recording paper as a recording medium by air pump suction, the discharge heads were moved to a drawing position toward the coated recording paper, and the ink was discharged at a drawing resolution of 600 dpi to draw an image. The drawing was conducted while changing dot areas at 16 stages in the dot size ranging from 15 μm to 60 μm by regulating the pulse voltage. The drawn image was stably printed with uniform dots without blur, where a clear image of good quality with a satisfactory density was given. The discharge stability from the ink heads was good, no clogging occurred, and dot-form printing could be stably conducted even in continuous image drawing over a long period of time.

Further, drawing was conducted in the sane manner using the ink composition after forced elapsing at 45° C. for one week. As a result, the drawn image was stably printed with uniform dots without blur, whereby a clear image of good quality with a satisfactory density was given. Also, the discharge stability was good, and dot-form printing could be stably conducted even in continuous image drawing over a long period of time.

Comparative Examples 1 and 2

<Preparation of Comparative Ink Compositions (IJR-1) and (IJR-2)>

Comparative Ink composition (IJR-1) was prepared in a manner exactly the same as in Example 1, except that in Example 1, the dispersion of pigment resin particles was diluted with Isopar a such that the concentration of the pigment resin particle component was 3.5%, and zirconium naphthenate (manufactured by Nihon Kagaku Sangyo Co., Ltd.) as a metallic soap was added as a charge control agent in place of the Illustrative Compound (1'-2) of the invention such that the metal content was 0.001 wt %. Also, Comparative Ink composition (IJR-2) was prepared in a manner exactly the same as in Example 1, except that in Example 1, manganese octylate as a metallic soap was added such that the metal content was 0.004 wt %. Both of the Comparative Ink Positions (IRJ-1) and (IRJ-2) had a viscosity of 1.4 cP and a surface tension of 23 mN/m. The Comparative Ink Compositions (IJR-1) and (IJR-2) exhibited a specific electric conductivity of 735 pS/cm and 667 pS/cm, respectively as a whole. Also, the Comparative Ink Compositions (IJR-1) and (IJR-2) exhibited a particle electric conductivity of blue resin particles of 551 pS/cm and 501 pS/cm, respectively. After forced elapsing at 45° C. for one week, the Comparative Ink Compositions (IJR-1) and (IJR-2) exhibited a specific electric conductivity of 445 pS/cm and 340 pS/cm, respectively as a whole. Also, the Comparative Ink Compositions (IJR-1) and (IJR-2) exhibited a particle electric conductivity of blue resin particles of 309 pS/cm and 221 pS/cm, respectively. Thus, the charge amount was reduced to not more than 60% of the initial charge amount, and therefore, it was noted that the change in the charge amount was large.

Next, electrostatic type inkjet drawing was conducted in the same manner as in Example 1 using the Comparative Ink Compositions, (IJR-1) and (IJR-2). As a result, the drawn images gave a clear image of good quality with a satisfactory density without blur. However, when the drawing was conducted in the same manner as in Example 1 using the Comparative Ink Compositions (IJR-1) and (IJR-2) after forced elapsing at 45° C. for one week, any of the drawn images markedly blurred, and the image densities thereof were low. Also, since discharge failure occurred, lacks in the image were observed so that satisfactory images were not obtained.

Examples 2 to 6

<Preparation of Ink Compositions (IJ-2) to (IJ-6)>

Ink Compositions (IJ-2) to (IJ-6) were each prepared in a manner exactly the sane as in Example 1, except that in Example 1, the dispersion of pigment resin particles was diluted with Isopar G such that the concentration of the pigment resin particle component was 3.5%, and a compound shown in Table A was added as a charge control agent in place of the Illustrative Compound (1'-2) of the invention.

The particle electric conductivity and printing evaluation of each of the Ink Compositions (IJ-2) to (IJ-6) are shown in Table A. Also, the particle electric conductivity and printing evaluation of blue resin particles of each of the Ink Compositions (IJ-2) to (IJ-6) after forced elapsing at 45° C. for one week are shown in Table A.

TABLE A

| Example | Ink Composition | Illustrative Compound | Before thermo-elapsing | | After thermo-elapsing | |
|---|---|---|---|---|---|---|
| | | | Particle electric conductivity (pS/cm) | Printing evaluation | Particle electric conductivity (pS/cm) | Printing evaluation |
| 2 | IJ-2 | (1'-4) | 449 | ○ | 444 | ○ |
| 3 | IJ-3 | (1'-6) | 468 | ○ | 473 | ○ |
| 4 | IJ-4 | (1'-8) | 474 | ○ | 474 | ○ |
| 5 | IJ-5 | (1'-10) | 480 | ○ | 471 | ○ |
| 6 | IJ-6 | (1'-12) | 452 | ○ | 442 | ○ |

Printing evaluation;
○: A drawn image had a satisfactory density without blur, and continuous printing could be stably conducted.
x: A drawn image blurred or had a low density, or continuous printing could not be stably conducted.

Example 7

<Preparation of Ink Composition (IJ-7)>

A composition of 100 parts by weight of Lionol Blue FG-7350 (Pigment Blue 15:3, manufactured by Toyo Ink Mfg. Co., Ltd.) as a blue pigment, 200 parts by weight of an octadecyl ester of Nucrel N-699 (manufactured by Du Pont-Mitsui Polychemicals Co., Ltd.) as a resin, which is an ethylene/methacrylic acid copolymer (molar ratio of ethylene unit to octadecyl methacrylate unit: 96.4/3.6), and 300 parts by weight of Isopar G was charged in a TK Ross double planetary mixer, 130LDM Model (manufactured by Tokushu Kika Kogyo Co., Ltd.) and stirred and kneaded at 95° C. for one hour at a rotation number of 50 rpm. Further, 600 parts of Isopar G was dividedly added over 2 hours under this condition, and kneading was continued.

Next, the kneaded mixture was released into a stainless steel vat and cooled to room temperature to obtain a sponge-like kneaded mixture.

One hundred parts by weight of this kneaded mixture and 600 parts by weight of Isopar G were charged in a paint shaker (manufactured by Toyo Seiki Co., Ltd.) using glass beads having a diameter of 4 mm an media, and the mixture was previously dispersed for 20 minutes. The resulting preliminarily kneaded mixture was subjected to wet dispersion in a dynomill, KDL Model (manufactured by Shinmaru Enterprises Corporation) using glass beads having a diameter of from about 0.75 to 1 mm at 3,000 rpm for 6 hours, to obtained a dense dispersion.

Next, Ink Composition (IJ-7) was prepared in a manner exactly the same as in Example 1, except that the dispersion of pigment resin particles was diluted with Isopar G such that the concentration of the pigment resin particle component was 3.5% and that 0.11 wt % of Illustrative Compound (1'-2) of the invention was added as a charge control agent. The pigment resin particles in the ink composition had a volume average particle size of 0.43 µm.

The resulting Ink Composition (IJ-7) had a viscosity of 1.4 cP, a surface tension of 23 mN/m, a specific electric conductivity of 620 pS/cm as a whole, and a particle electric conductivity of blue resin particles of 581 pS/cm. 90% or more of the charge amount of the ink composition was applied to the pigment resin particles, and clear positive charge property was revealed.

After forced elapsing at 45° C. for one week, the ink composition had a specific electric conductivity of 593 pS/cm and a particle electric conductivity of pigment resin particles of 557 pS/cm, respectively. Thus, it was noted that the charge amount did not substantially change and was extremely stable.

Electrostatic type inkjet drawing was conducted in the same manner as in Example 1 using the Ink Composition (IJR-7). As a result, the drawn image was stably printed with uniform dots without blur, whereby a clear image of good quality with a satisfactory density was given. Also, the discharge stability was good, and dot-foe printing could be stably conducted even in continuous image drawing over a long period of time. Also, the drawn image after forced elapsing at 45° C. for one week gave a clear image of good quality with a satisfactory density without blur likewise the case before forced thermo-elapsing.

Comparative Example 3

<Preparation of Comparative Ink Composition (IJR-3)>

Comparative Ink Composition (IJR-3) was prepared in a manner exactly the same as in Example 1, except that in Example 1, the dispersion of pigment resin particles was diluted with Isopar G such that the concentration of the pigment resin particle component was 3.5%, and zirconium naphthenate (manufactured by Nihon Kagaku Sangyo Co, Ltd.) as a metallic soap was added as a charge control agent in place of the Illustrative Compound (1'-2) of the invention such that the metal content was 0.08 wt %. The Comparative Ink Composition (IRJ-3) had a viscosity of 1.4 cP and a surface tension of 23 mN/m. The Comparative Ink Composition (IJR-3) exhibited a specific electric conductivity of 718 pS/cm as a whole and a particle electric conductivity of blue resin particles of 531 pS/cm, respectively. After forced elapsing at 45° C. for one week, the Comparative Ink Composition (IJR-3) exhibited a specific electric conductivity of 435 pS/cm as a whole and a particle electric conductivity of blue resin particles of 312 pS/cm, respectively. Thus, the charge amount was largely reduced an compared with the initial charge amount, and therefore, it was noted that the change in the charge amount was large.

Next, electrostatic type inkjet drawing was conducted in the same manner as in Example 1 using the Comparative Ink Composition (IJR-3). As a result, the drawn images gave a clear image of good quality with a satisfactory density without blur. However, when the drawing was conducted in the same manner as in Example 1 using the Comparative Ink Composition (IJR-3) after forced elapsing at 45° C. for one week, the drawn image markedly blurred, and the image density thereof was low. Also, since discharge failure occurred, lacks in the image were observed so that satisfactory images were not obtained.

Examples 8 to 11

<Preparation of Ink Compositions (IJ-8) to (IJ-11)>

Ink Compositions (IJ-8) to (IJ-11) were each prepared in a manner exactly the sate as in Example I, except that in Example 1, the dispersion of pigment resin particles was diluted with Isopar G such that the concentration of the pigment resin particle component was 3.5%, and a compound shown in Table B was added as a charge control agent in place of the Illustrative Compound (1'-2) of the invention.

The particle electric conductivity and printing evaluation of each of the Ink Compositions (IJ-9) to (IJ-11) are shown in Table B. Also, the particle electric conductivity and printing evaluation of blue resin particles of each of the Ink Compositions (IJ-8) to (IJ-11) after forced elapsing at 45° C. for one week are shown in Table B.

2,2'-azo-bis(butyronitrile) was further added, the temperature was raised to 80° C., and the mixture was stirred for 4 hours. After cooling, the reaction mixture was added in 3.5 L of acetonitrile with stirring over 15 minutes, and the mixture was stirred for one hour as it was. A deposited solid was collected by filtration and dried in vacuo to obtain 132 g of a white solid.

Intermediate Preparation Example 4

Intermediate Illustrative Compound (2-6)

A mixture of 49 g of maleic anhydride, 163 g of octadodecylvinyl ether and 790 g of toluene was heated at a temperature of 70° C. with stirring in a nitrogen atmosphere. 2,2'-Azobis(butyronitrile) (2 g) was added, and the fixture was stirred for 3 hours. Thereafter, 2 g of 2,2'-azobis-(butyronitrile) was further added, the temperature was raised to 80° C., and the mixture was stirred for 4 hours. After cooling, the reaction mixture was added in 4.0 L of acetonitrile with stirring over 15 minutes, and the mixture was stirred for one hour as it was. A deposited solid was collected by filtration and dried in vacuo to obtain 177 g of a white solid.

Intermediate Preparation Example 5

Intermediate Illustrative Compound (2-8)

A mixture of 49 g of maleic anhydride, 144.2 g of allyl laurate and 395 g of dioxane was heated at a temperature of 70° C. with stirring in a nitrogen atmosphere. 2,2'-Azo-bis(butyronitrile) (1.7 g) was added, and the mixture was stirred for 3 hours. Thereafter, 1.7 g of 2,2'-azobis-(butyronitrile) was further added, the temperature was raised to 85° C., and the mixture was stirred for 4 hours. After cooling, the reaction mixture was added in 2.8 L of acetonitrile with stirring over 15 minutes, and the mixture was stirred for one

TABLE B

| | | | Before thermo-elapsing | | After thermo-elapsing | |
|---|---|---|---|---|---|---|
| Example | Ink Composition | Illustrative Compound | Particle electric conductivity (pS/cm) | Printing evaluation | Particle electric conductivity (pS/cm) | Printing evaluation |
| 8 | IJ-8 | (1'-10) | 571 | ○ | 554 | ○ |
| 9 | IJ-9 | (1'-12) | 588 | ○ | 564 | ○ |
| 10 | IJ-10 | (1'-15) | 574 | ○ | 568 | ○ |
| 11 | IJ-11 | (1'-18) | 590 | ○ | 572 | ○ |

Printing evaluation:
o: A drawn image had a satisfactory density without blur, and continuous printing could be stably conducted.
x: A drawn image blurred or had a low density, or continuous printing could not be stably conducted.

[Synthesis of Maleic Anhydride-Containing Copolymer (Intermediate)]

Intermediate Preparation Example 3

Intermediate Illustrative Compound (2-3)

A mixture of 49 g of maleic anhydride, 117 g of dodecylvinyl ether and 620 g of methyl ethyl ketone was heated at a temperature of 70° C. with stirring in a nitrogen atmosphere. 2,2'-Azobis butyronitrile) (1.5 g) was added, and the mixture was stirred for 3 hours. Thereafter, 1.5 g of hour as it was. A deposited solid was collected by filtration and dried in vacuo to obtain 140 g of a white solid.

Intermediate Preparation Example 6

Intermediate Illustrative Compound (2-1)

A mixture of 49 g of maleic anhydride, 136 g of vinyl laurate and 380 g of toluene was heated at a temperature of 75° C. with stirring in a nitrogen atmosphere. 2,2'-Azo-bis(butyronitrile) (1.6 g) was added, and the mixture was stirred for 3 hours. Thereafter, 1.6 g of 2,2'-azobis-(butyronitrile)

was further added, the temperature was raised to 85° C., and the mixture was stirred for 4 hours. After cooling, the reaction mixture was added in 2.7 L of acetonitrile with stirring over 15 minutes, and the mixture was stirred for one hour as it was. A deposited solid was collected by filtration and dried in vacuo to obtain 138 g of a white solid.

Intermediate Preparation Example 7

Intermediate Illustrative Compound (2-2)

A mixture of 49 g of maleic anhydride, 170 g of vinyl stearate and 480 g of toluene was heated at a temperature of 80° C. with stirring in a nitrogen atmosphere. Benzoyl peroxide (2.09 g) was added, and the mixture was stirred for 3 hours. Thereafter, 2.09 g of benzoyl peroxide was further added, the temperature was raised to 90° C., and the mixture was stirred for 4 hours. After cooling, the reaction mixture was added in 3.2 L of acetonitrile with stirring over 15 minutes, and the mixture was stirred for one hour as it was. A deposited solid was collected by filtration and dried in vacuo to obtain 184 g of a white solid.

[Synthesis of Half-Amide Maleic Acid-Containing Copolymer (Compound of the Invention)]

Compound Preparation Example 4

Illustrative Compound (2'-3) of the Invention

A mixture of 31 g of the white solid obtained in Intermediate Preparation Example 4, 24.1 g of n-hexadecylamine, 130 g of methyl ethyl ketone and 1.0 g of pyridine was heated at a temperature of 70° C. and reacted with stirring for 10 hours. After cooling, the reaction mixture was added in 1.0 L of methanol with stirring over 15 minutes, and the mixture was further stirred for one hour. A deposited solid was collected by filtration and dried in vacuo to obtain 69 g of a pale whitish yellow solid. The resulting compound had a molecular weight measured by high-performance liquid chromatography of 15,000.

Compound Preparation Example 5

Illustrative Compound (2'-2) of the Invention

A mixture of 31 g of the white solid obtained in Intermediate Preparation Example 4, 27 g of n-octadecylamine, 130 g of methyl ethyl ketone and 1.0 g of pyridine was heated at a temperature of 70° C. and reacted with stirring for 10 hours. After cooling, the reaction mixture was added in 1.0 L of methanol with stirring over 15 minutes, and the mixture was further stirred for one hour. A deposited solid was collected by filtration and dried in vacuo to obtain 48 g of a pale whitish yellow solid. The resulting compound had a molecular weight measured by high performance liquid chromatography of 15,000.

Compound Preparation Example 6

Illustrative Compound (2'-4) of the Invention

A mixture of 31 g of the white solid obtained Intermediate Preparation Example 4, 28.4 g of N-methyl-n-octadecylamine, 130 g of methyl ethyl ketone and 2.0 g of pyridine was heated at a temperature of 90° C. and reacted with stirring for 10 hours. After cooling, the reaction mixture was added in 1.0 L of methanol with stirring over 15 minutes, and the mixture was further stirred for one hour. A deposited solid was collected by filtration and dried in vacuo to obtain 45 g of a pale whitish yellow solid. The resulting compound had a molecular weight measured by high-performance liquid chromatography of 15,000.

Compound Preparation Example 7

Illustrative Compound (2'-6) of the Invention

A mixture of 35 g of the white solid obtained in Intermediate Preparation Example 5, 24 g of hexadecylamine, 140 g of methyl ethyl ketone and 1.0 g of pyridine was heated at a temperature of 70° C. and reacted with stirring for 10 hours. After cooling, the reaction mixture was added in 1.2 L of methanol with stirring over 15 minutes, and the mixture was further stirred for one hour. A deposited solid was collected by filtration and dried in vacuo to obtain 50 g of a pale whitish yellow solid. The resulting compound had a molecular weight measured by high-performance liquid chromatography of 17,000.

Compound Preparation Example 8

Illustrative Compound (2'-8) of the Invention

A mixture of 34 g of the white solid obtained in Intermediate Preparation Example 6, 18.6g of n-dodecylamine, 120 g of methyl ethyl ketone and 1.0 g of pyridine was heated at a temperature of 70° C. and reacted with stirring for 10 hours. After cooling, the reaction mixture was added in 1.0 L of methanol with stirring over 15 minutes, and the mixture was further stirred for one hour. A deposited solid was collected by filtration and dried in vacuo to obtain 43 g of a pale whitish yellow solid. The resulting compound had a molecular weight measured by high-performance liquid chromatography of 12,000.

Compound Preparation Example 9

Illustrative Compound (2'-12) of the Invention

A mixture of 20.4 g of the white solid obtained in Intermediate Preparation Example 8, 6.4 g of n-octylamine, 80 g of methyl ethyl ketone and 0.8 g of pyridine was heated at a temperature of 70° C. and reacted with stirring for 10 hours. After cooling, the reaction mixture was added in 800 mL of methanol with stirring over 15 minutes, and the mixture was further stirred for one hour. A deposited solid was collected by filtration and dried in vacuo to obtain 28 g of a pale whitish yellow solid. The resulting compound had a molecular weight measured by high-performance liquid chromatography of 15,000.

Example 12

<Preparation of Ink Composition (IJ-12)>

One hundred parts by weight of Lionol Blue FG-7350 (Pigment Blue 15:3, manufactured by Toyo Ink Mfg. Co., Ltd.) as a blue pigment and 200 parts by weight of a styrene/vinyltoluene/lauryl methacrylate/trimethylammoniumethyl methacrylate (anion: p-toluenemulfonic acid)

copolymer (molar ratio: 47/47/1/5) as a resin were previously pulverized and well mixed in a trio blender, and the mixture was melt kneaded (for 120 minutes) in a bench-top kneader PBV (manufactured by Irie Shokai Co. Ltd.) heated at 100° C. The kneaded pigment mixture was further pulverized in a pin mill. Next, 20 parts by weight of the resulting kneaded pigment mixture, 130 parts by weight of Isopar G, and 50 parts by weight of a 20 wt % solution prepared by dissolving the foregoing Pigment Dispersant D-1 in Isopar G by heating were mixed together with 400 parts by weight of 3G-X glass beads in a paint shaker (manufactured by Toyo Seiki Co., Ltd.) for 120 minutes. The volume average particle size of pigment particles in the resulting dispersion was measured by an ultra-centrifugal automatic particle size distribution analyzer CAPA700 (manufactured by Horiba, Ltd.). As a result, it was found to be 0.45 μm.

The foregoing dispersion of pigment resin particles from which the glass beads had been removed by filtration was diluted with Isopar G such that the concentration of the pigment resin particle component was 3.5%. Next, Illustrative Compound (2'-3) of the invention as a charge control agent was added such that its content was 0.003 wt %, to prepare Ink Composition (IJ-12). The resulting ink composition had a viscosity of 1.4 cP (measured at a temperature of 25° C. using an E type viscometer) and a surface tension of 23 mN/m (measured at a temperature of 25° C. using an automatic surface tensiometer manufactured by Kyowa Interface Science Co., Ltd.). Also, the charge amount of the ink composition was determined from a specific electric conductivity measured under conditions of an applied voltage of 5 V and a frequency of 1 kHz using an LCR meter (AG-4311, manufactured by Ando Electric Co., Ltd.) and an electrode for liquid (Model LP-05, manufactured by Kawaguchi Electric Works Co., Ltd.). The particle electric conductivity of the pigment resin particle was determined by subtracting a specific electric conductivity of a supernatant of the ink composition after centrifugation from a specific electric conductivity of the whole of the ink composition. Also, the centrifugation was conducted for 30 minutes under conditions of a rotation number of 14,500 rpm and a temperature of 23° C. using a mall-sized high-speed refrigerated centrifuge (SRX-201, manufactured by Tomy Seiko Co., Ltd.) The Ink Composition (IJ-12) exhibited a specific electric conductivity of 509 pS/cm as a whole. Also, the blue resin particles exhibiting distinct positive charge property exhibited a particle electric conductivity of 455 pS/cm, and 80% or more of the charge amount of the ink composition was applied to the pigment resin particles. After forced elapsing at 45° C. for one week, the specific electric conductivity of the ink composition was 485 pS/cm, and the particle electric conductivity of the pigment resin particle was 440 pS/cm, respectively. Thus, it was noted that the charge amount did not substantially change and was extremely stable.

<Image Drawing Property>

An inkjet device equipped with 64-channel (100 dpi) electrostatic type inkjet heads having the structure as shown in FIG. 1 was used, and the Ink Composition (IJ-12) was charged in an ink tank thereof. After removing dusts on the surface of coated recording paper as a recording medium by air pump suction, the discharge heads were moved to a drawing position toward the coated recording paper, and the ink was discharged at a drawing resolution of 600 dpi to draw an image. The drawing was conducted while changing dot areas at 16 stages in the dot size rat from 15 μm to 60 μm by regulating the pulse voltage. The drawn image was stably printed with uniform dots without blur, whereby a clear image of good quality with a satisfactory density was given. The discharge stability from the ink heads was good, no clogging occurred, and dot-form printing could be stably conducted even in continuous image drawing over a long period of time.

Further, drawing was conducted in the same manner using the ink composition after forced elapsing at 45° C. for one week. AS a result, the drawn image was stably printed with uniform dots without blur, whereby a clear image of good quality with a satisfactory density was given. Also, the discharge stability was good, and dot-form printing could be stably conducted even in continuous image drawing over a long period of time.

Comparative Examples 4 and 5

<Preparation of Comparative Ink Compositions (IJR-4) and (IJR-5)>

Comparative Ink Composition (IJR-4) was prepared in a manner exactly the same as in Example 12, except that in Example 12, the dispersion of pigment resin particles was diluted with Isopar G such that the concentration of the pigment resin particle component was 3,5%, and zirconium naphthenate (manufactured by Nihon Kagaku Sangyo Co., Ltd.) as a metallic soap was added as a charge control agent in place of the Illustrative Compound (2'-3) of the invention such that the metal content was 0.001 wt %. Also, Comparative Ink Composition (IJR-5) was prepared in a manner exactly the sane as in Example 12, except that in Example 12, manganese octylate as a metallic soap was added such that the metal content was 0.004 wt %. Both of the Comparative Ink Compositions (IRJ-4) and (IRJ-5) had a viscosity of 1.4 cP and a surface tension of 23 mN/m. The Comparative Ink Compositions (IJR-4) and (IJR-5) exhibited a specific electric conductivity of 735 pS/cm and 667 pS/cm, respectively as a whole. Also, the Comparative Ink Compositions (IJR-4) and (IJR-5) exhibited a particle electric conductivity of blue resin particles of 551 pS/cm and 501 pS/cm, respectively. After forced elapsing at 45° C. for one week, the Comparative Ink Compositions (IJR-4) and (IJR-5) exhibited a specific electric conductivity of 445 pS/cm and 340 pS/cm, respectively as a whole. Also, the Comparative Ink Compositions (IJR-4) and (IJR-5) exhibited a particle electric conductivity of blue resin particles of 309 pS/cm and 221 pS/cm, respectively. Thus, the charge amount was reduced to not more than 60% of the initial charge amount, and therefore, it was noted that the change in the charge amount was large.

Next, electrostatic type inkjet drawing was conducted in the same manner as in Example 12 using the Comparative Ink Compositions (IJR-4) and (IJR-5). As a result, the drawn images gave a clear image of good quality with a satisfactory density without blur. However, when the drawing was conducted in the sore manner as in Example 12 using the Comparative Ink Compositions (IJR-4) and (IJR-5) after forced elapsing at 45° C. for one week, any of the drawn images markedly blurred, and the image densities thereof were low. Also, since discharge failure occurred, lacks in the huge were observed so that satisfactory images were not obtained.

Examples 13 to 17

<Preparation of Ink Compositions (IJ-13) to (IJ-17)>

Ink Compositions (IJ-13) to (IJ-17) were each prepared in a manner exactly the same as in Example 12, except that in Example 12, the dispersion of pigment resin particles was diluted with Isopar G such that the concentration of the pigment resin particle component was 3.5%, and a compound shown in Table C was added as a charge control agent in place of the Illustrative Compound (2'-3) of the invention.

The particle electric conductivity and printing evaluation of each of the Y Compositions (IJ-13) to (IJ-17) are shown in Table C. Also, the particle electric conductivity and printing evaluation of blue resin particles of each of the ink Compositions (IJ-13) to (IJ-17) after forced elapsing at 45° C. for one week are shown in Table C.

eter of from about 0.75 to 1 mm at 3,000 rpm for 6 hours, to obtained a dense dispersion.

Next, ink Composition (IJ-18) was prepared in a manner exactly the same as in Example 12, except that in Example 12, the dispersion of pigment resin particles was diluted with Isopar G such that the concentration of the pigment resin particle component was 3.5%, and 0.18 wt % of illustrative Compound (2'-2) of the invention was added as a charge control agent. The pigment resin particles in the ink composition had a volume average particle size of 0.43 µm.

The resulting Ink Composition (IJ-18) had a viscosity of 1.4 cP, a surface tension of 23 mN/m, a specific electric conductivity of 682 pS/cm as a whole, and a particle electric conductivity of blue resin particles of 639 pS/cm. 90% or more of the charge amount of the ink composition was applied to the pigment resin particles, and clear positive charge property was revealed.

After forced elapsing at 45° C. for one week, the ink composition had a specific electric conductivity of 652 pS/cm and a particle electric conductivity of pigment resin

TABLE C

| | | | Before thermo-elapsing | | After thermo-elapsing | |
|---|---|---|---|---|---|---|
| Example | Ink Composition | Illustrative Compound | Particle electric conductivity (pS/cm) | Printing evaluation | Particle electric conductivity (pS/cm) | Printing evaluation |
| 13 | IJ-13 | (2'-2) | 445 | ○ | 434 | ○ |
| 14 | IJ-14 | (2'-4) | 468 | ○ | 468 | ○ |
| 15 | IJ-15 | (2'-6) | 471 | ○ | 471 | ○ |
| 16 | IJ-16 | (2'-8) | 473 | ○ | 465 | ○ |
| 17 | IJ-17 | (2'-12) | 458 | ○ | 442 | ○ |

Printing evaluation:
○: A drawn image had a satisfactory density without blur, and continuous printing could be stably conducted.
x: A drawn image blurred or had a low density, or continuous printing could not be stably conducted.

Example 18

<Preparation of Ink Composition (IJ-18)>

A composition of 100 parts by weight of Lionel Blue FG-7350 (Pigment Blue 15:33, manufactured by Toyo Ink Meg. Co., Ltd.) as a blue pigment, 200 parts by weight of an octadecyl ester of Nucrel N-699 (manufactured by Du Pont-Mitsui Polychemicals Co., Ltd.) as a resin, which is an ethylene/methacrylic acid copolymer (molar ratio of ethylene unit to octadecyl methacrylate unit: 96.4/3.6), and 300 parts by weight of Isopar G was charged in a TX Ross double planetary mixer, 130LDM Model (manufactured by Tokushu Kika Kogyo Co., Ltd.) and stirred and kneaded at 95° C. for one hour at a rotation number of 50 rpm. Further, 600 parts of Isopar G was dividedly added over 2 hours under this condition, and kneading was continued.

Next, the kneaded mixture was released into a stainless steel vat and cooled to room temperature to obtain a singe-like kneaded mixture.

One hundred parts by weight of this kneaded mixture and 600 parts by weight of Isopar G were charged in a paint shaker (manufactured by Toyo Seiki Co., Ltd.) using glass beads having a diameter of 4 mm as media, and the mixture was previously dispersed for 20 minutes. The resulting preliminarily kneaded mixture was subjected to wet dispersion in a dynomill, KDL Model (manufactured by Shinmaru Enterprises Corporation) using glass beads having a diamparticles of 613 pS/cm, respectively. Thus, it was noted that the charge amount did not substantially change and was extremely stable.

Electrostatic type inkjet drawing was conducted in the same manner as in Example 12 using the Ink Composition (IJR-18). As a result, the drawn image was stably printed with uniform dots without blur, where a clear image of good quality with a satisfactory density was given. Also, the discharge stability was good, and dot-form printing could be stably conducted even in continuous image drawing over a long period of time. Also, the drawn image after forced elapsing at 45° C. for one week gave a clear image of good quality with a satisfactory density without blur likewise the case before forced thermo-elapsing.

Comparative Example 6

<Preparation of Comparative Ink Composition (IJR-6)>

Comparative Ink Composition (IJR-6) was prepared in a manner exactly the same as in Example 13, except that in Example 13, the dispersion of pigment resin particles was diluted with Isopar G such that the concentration of the pigment resin particle component was 3.5%, and zirconium naphthenate, (manufactured by Nihon Kagaku Sangyo Co., Ltd.) as a metallic soap was added as a charge control agent in place of the Illustrative Compound (2'-2) of the invention such that the metal content was 0.08 wt %. The Comparative Ink Composition (IRJ-6) had a viscosity of 1.4 cP and a surface tension of 23 mN/m. The Comparative Ink Composition (IJR-6) exhibited a specific electric conductivity of 718 pS/cm as a whole and a particle electric conductivity of blue resin particles of 531 pS/cm, respectively. After forced elapsing at 45° C. for one week, the Comparative Ink Composition (IJR-6) exhibited a specific electric conductivity of 435 pS/cm as a whole and a particle electric conductivity of blue resin particles of 312 pS/cm, respectively. Thus, the charge amount was largely reduced as compared with the initial charge amount, and therefore, it was noted that the change in the charge amount was large.

Next, electrostatic type inkjet drawing was conducted in the same manner as in Example 12 using the Comparative Ink Composition (IJR-6). As a result, the drawn images gave a clear image of good quality with a satisfactory density without blur. However, when the drawing was conducted in the same manner as in Example 12 using the Comparative Ink Composition (IJR-6) after forced elapsing at 45° C. for one week, the drawn image markedly blurred, and the image density thereof was low. Also, since discharge failure occurred, lacks in the image were observed so that satisfactory images were not obtained.

Examples 19 to 22

<Preparation of Ink Compositions (IJ-19) to (IJ-22)>

Ink Compositions (IJ-19) to (IJ-22) were each prepared in a manner exactly the same as in Example 13, except that in Example 13, the dispersion of pigment resin particles was diluted with Isopar G such that the concentration of the pigment resin particle component was 3.5%, and a compound shown in Table D was added as a charge control agent in place of the Illustrative Compound (2'-2) of the invention.

The particle electric conductivity and printing evaluation of each of the Ink Compositions (IJ-19) to (IJ-22) are shown in Table D. Also, the particle electric conductivity and printing evaluation of blue resin particles of each of the Ink Compositions (IJ-19) to (IJ-22) after forced elapsing at 45° C. for one week are shown in Table D.

g of benzoyl peroxide was added, and the mixture was stirred for 4 hours. The resulting polymer solution had a solids content of 22.5%.

Intermediate Preparation Example 9

Intermediate Illustrative Compound (3-5)

A mixture of 98 g of maleic anhydride, 378 g of 1-octadecene and 1,850 g of toluene was heated at a temperature of 90° C. with stirring in a nitrogen atmosphere. At that temperature, 7.0 g of benzoyl peroxide as an initiator was added, and the Mixture was stirred for 3 hours. Further, 7.0 g of benzoyl peroxide was added, and the mixture was stirred for 5 hours. The resulting polymer solution had a solids content of 14.8%.

Intermediate Preparation Example 10

Intermediate Illustrative Compound (3-15)

A mixture of 49 g of maleic anhydride, 135 g of vinyl laurate and 430 g of methyl isobutyl ketone was heated at a temperature of 80° C. with stirring in a nitrogen atmosphere. At that temperature, 2.4 g of benzoyl peroxide was added, and the mixture was stirred for 3 hours. Further, 2.4 g of benzoyl peroxide was added, and the mixture was stirred for 5 hours. After cooling, the reaction mixture was added in 3.0 L of acetonitrile with stirring over 10 minutes, and the mixture was stirred for 30 minutes as it was. A precipitated solid was collected by filtration and dried in vacuo to obtain 185 g of a white solid.

Intermediate Preparation Example 11

Intermediate Illustrative Compound (3-16)

A mixture of 49 g of maleic anhydride, 186 g of vinyl stearate and 550 g of toluene was heated at a temperature of

TABLE D

| Example | Ink Composition | Illustrative Compound | Before thermo-elapsing | | After thermo-elapsing | |
| --- | --- | --- | --- | --- | --- | --- |
| | | | Particle electric conductivity (pS/cm) | Printing evaluation | Particle electric conductivity (pS/cm) | Printing evaluation |
| 19 | IJ-19 | (2'-3) | 568 | ○ | 551 | ○ |
| 20 | IJ-20 | (2'-4) | 582 | ○ | 564 | ○ |
| 21 | IJ-21 | (2'-8) | 574 | ○ | 565 | ○ |
| 22 | IJ-22 | (2'-12) | 583 | ○ | 568 | ○ |

Printing evaluation:
○: A drawn image had a satisfactory density without blur, and continuous printing could be stably conducted.
x: A drawn image blurred or had a low density, or continuous printing could not be stably conducted.

Intermediate Preparation Example 8

Intermediate Illustrative Compound (3-2)

A mixture of 98 g of maleic anhydride, 252 g of 1-dodecene and 816 g of toluene was heated at a temperature of 85° C. with stirring in a nitrogen atmosphere. At that temperature, 6.0 g of benzoyl peroxide as an initiator was added, and the mixture was stirred for 3 hours. Further, 6.0

85° C. with stirring in a nitrogen atmosphere. At that temperature, 4.0 g of benzoyl peroxide was added, and the mixture was stirred for 3 hours. Further, 4.0 g of benzoyl peroxide was added, and the mixture was stirred for 4 hours. After cooling, the reaction mixture was added in 3.0 L of acetonitrile with stirring over 10 minutes, and the mixture was stirred for 30 minutes as it was. A precipitated solid was collected by filtration and dried in vacuo to obtain 165 g of a white solid.

Intermediate Preparation Example 12

Intermediate Illustrative Compound (3-12)

A mixture of 49 g of maleic anhydride, 178 g of n-octadecylvinyl ether and 835 g of toluene was heated at a temperature of 70° C. with stirring in a nitrogen atmosphere. At that temperature, 2.1 g of 2,2'-azobis.isobutyronitrile was added, and the mixture was stirred for 3 hours. Further, 2.1 g of 2,2'-azobis.isobutyronitrile was added, the temperature was raised to 85° C., and the mixture was stirred for 4 hours. After cooling, the reaction mixture was added in 5.0 L of acetonitrile with stirring over 10 minutes, and the mixture was stirred for 30 minutes as it was. A precipitated solid was collected by filtration and dried in vacuo to obtain 167 g of a white solid.

Compound Preparation Example 10

Specific Example (1)

A mixture of 100 g of the polymer solution obtained in Intermediate Preparation Example 8, 23.2 g of n-octadecylamine and 2 g of pyridine was stirred at a temperature of 100° C. for 8 hours. After cooling, the reaction mixture was added in 800 mL of methanol with stirring over 15 minutes, and the mixture was further stirred for one hour as it was. A precipitated solid was collected by filtration and dried in vacuo to obtain 37 g of a pale yellowish white solid. The resulting compound had a molecular weight measured by high-performance liquid chromatography of 11,000. Also, as a result of neutralization titration with a solution of potassium hydroxide in ethanol, a proportion of the half-amide maleic acid component to the maleinimide component was found to be 6/4.

Compound Preparation Example 11

Specific Example (2)

A mixture of 100 g of the polymer solution obtained in Interrogate Preparation Example 9, 11.6 g of n-hexadecylmine and 1.0 g of pyridine was heated under refluxing the solvent with stirring for 6 hours. After cooling, the reaction mixture was added in 600 mL of methanol with stirring over 15 minutes, and the mixture was further stirred for one hour as it was. A precipitated solid was collected by filtration and dried in vacuo to obtain 22.6 g of a pale whitish yellow solid. The resulting compound had a molecular weight measured by high-performance liquid chromatography of 7,000. As a result of neutralization titration, a proportion of the half-amide maleic acid component to the maleinimide component was found to be 5/5.

Compound Preparation Example 12

Specific Example (3)

A mixture of 100 g of the polymer solution obtained in Intermediate Preparation Example 10, 4.0 g of N-methyl-octadecylamine and 1.5 g of pyridine was heated at a temperature of 100° C. and stirred for 10 hours. Thereafter, 1.8 g of n-hexylamine was added, and the mixture was stirred at that temperature of 8 hours. After cooling, the reaction mixture was added in 1.0 L of methanol with stirring over 15 minutes, and the mixture was further stirred for one hour as it was. A precipitated solid was collected by filtration and dried in vacuo to obtain 17.5 g of a pale yellow solid. The resulting compound had a molecular weight measured by high-performance liquid chromatography of 7,000 As a result of neutralization titration, a proportion of the half-amide maleic acid component to the maleinimide component was found to be 7/3.

Compound Preparation Example 13

Specific Example (4)

A mixture of 27 g of the white solid obtained in Intermediate Preparation Example 11, 13 g of n-octylamine, 0.8 g of pyridine and 100 g of dioxane was stirred at a temperature of 110° C. for 6 hours. After Cooling, the reaction mixture was added in 1.0 L of methanol with stirring over is minutes, and the mixture was further stirred for one hour as it was. A precipitated solid was collected by filtration and dried in vacuo to obtain 34 g of a pale whitish yellow solid. The resulting compound had a molecular weight measured by high-performance liquid chromatography of 17,000. As a result of neutralization titration, a proportion of the half-amide maleic acid component to the maleinimide component was found to be 7/3.

Compound Preparation Example 14

Specific Example (5)

A mixture of 39.4 g of the solid obtained in Intermediate Preparation Example 12, 26.9 g of n-octadecylamine, 2.3 g of pyridine and 100 g of xylene was stirred at a temperature of 120° C. for 5 hours. After cooling, the reaction mixture was added in 1.0 L of methanol with stirring over 15 minutes, and the mixture was further stirred for one hour as it was. A precipitated solid was collected by filtration and dried in vacuo to obtain 57 g of a pale yellowish white solid. The resulting compound had a molecular weight measured by high-performance liquid chromatography of 19,000. As a result of neutralization titration, a proportion of the half-amide maleic acid component to the maleinimide component was found to be 4/6.

Example 23

<Preparation of Ink Composition (IJ-23)>

One hundred parts by weight of Lionol Blue FG-7350 (Pigment Blue 15:3, manufactured by Toyo Ink Mfg. Co., Ltd.) as a blue pigment and 200 parts by weight of a styrene/vinyltoluene/lauryl methacrylate/trimethylammoniumethyl methacrylate (anion: p-toluenesulfonic acid) copolymer (molar ratio: 47/47/1/5) as a resin were previously pulverized and well mixed in a trio blender, and the mixture was melt kneaded (for 120 minutes) in a bench-top kneader PBV (manufactured by Irie Shokai Co., Ltd.) heated at 100° C. The kneaded pigment mixture was further pulverized in a pin mill. Next, 20 parts by weight of the resulting kneaded pigment mixture, 130 parts by weight of Isopar G, and 50 parts by weight of a 20 wt % solution prepared by dissolving the foregoing Pigment Dispersant D-1 in Isopar G by heating were mixed together with 400 parts by weight of 3G-X glass beads in a paint shaker (manufactured by Toyo Seiki Co., Ltd.) for 120 minutes. The volume average particle size of pigment particles in the resulting dispersion was measured by an ultra-centrifugal automatic particle size distribution analyzer CAPA700 (manufactured by Horiba, Ltd.). As a result, it was found to be 0.45 μm.

The foregoing dispersion of pigment resin particles from which the glass beads had been removed by filtration was diluted with Isopar G such that the concentration of the pigment resin particle component was 3.5%. Next, the confound of Specific Example (1) as a charge control agent was added such that its content was 0.002 wt %, to prepare Ink Composition (IJ-23). The resulting ink composition had a viscosity of 1.4 cP (measured at a temperature of 25° C. using an E type viscometer) and a surface tension of 23 mN/m (measured at a temperature of 25° C. using an automatic surface tensiometer manufactured by Kyowa Interface Science Co., Ltd.). Also, the charge amount of the ink composition was defined from a specific electric conductivity measured under conditions of an applied voltage of 5 V and a frequency of 1 kHz using an LCR meter (AG-4311, manufactured by Ando Electric Co., Ltd.) and an electrode for liquid (Model LP-05, manufactured by Kawaguchi Electric Works Co., Ltd.). The particle electric conductivity of the pigment resin particle was determined by subtracting a specific electric conductivity of a supernatant of the ink composition after centrifugation from a specific electric conductivity of the whole of the ink composition. Also, the centrifugation was conducted for 30 minutes under conditions of a rotation number of 14,500 rpm a temperature of 23° C. using a small-sized high-speed refrigerated centrifuge (SRX-201, manufactured by Tomy Seiko Co., Ltd.). The Ink Composition (IJ-23) exhibited a specific electric conductivity of 643 pS/cm as a whole. Also, the blue resin particles exhibiting distinct positive charge property exhibited a particle electric conductivity of 571 pS/cm, and 80% d or more of the charge amount of the ink composition was applied to the pigment resin particles. Also, after forced elapsing at 45° C. for one week, the specific electric conductivity of the ink composition was 612 pS/cm, and the particle electric conductivity of the pigment resin particle was 555 pS/cm, respectively. Thus, it was noted that the charge amount did not substantially change and was extremely stable.

<Image Drawing Property>

An inkjet device equipped with 64-channel (100 dpi) electrostatic type inkjet heads having the structure as shown in FIG. 1 was used, and the Ink Composition (IJ-23) was aged in an ink tank thereof. After removing dusts on the surface of coated recording paper as a recording medium by air pump suction, the discharge heads were moved to a drawing position toward the coated recording paper, and the ink was discharged at a drawing resolution of 600 dpi to draw an image. The drawing was conducted while changing dot areas at 16 stages in the dot size ranging from 15 μm to 60 μm by regulating the pulse voltage. The drawn image was stably printed with uniform dots without blur, where a clear image of good quality with a satisfactory density was given. The discharge stability from the ink heads was good, no clogging occurred, and dot-form printing could be stably conducted even in continuous image drawing over a long period of time.

Further, drawing was conducted in the same manner using the ink composition after forced elapsing at 45° C. for one week. As a result, the drawn image was stably printed with uniform dots without blur, whereby a clear image of good quality with a satisfactory density was given. Also, the discharge stability was good, and dot-form printing could be stably conducted even in continuous image drawing over a long period of time.

Comparative Examples 7 and 8

<Preparation of Comparative Ink Compositions (IJR-7) and (IJR-8)>

Comparative Ink Composition (IJR-7) was prepared in a manner exactly the same as in Example 23, except that in Example 23, the dispersion of pigment resin particles was diluted with Isopar G such that the concentration of the pigment resin particle component was 3.5%, and zirconium naphthenate (manufactured by Nihon Kagaku Sangyo Co., Ltd.) as a metallic soap was added as a charge control agent in place of the compound of Specific Example (1) such that the metal content was 0.001 wt %. Also, Comparative ink Composition (IJR-8) was prepared in a manner exactly the same as in Example 23, except that in Example 23, manganese octylate as a metallic soap was ad such that the metal content was 0.004 wt %. Both of the Comparative Ink Compositions (IRJ-7) and (IRJ-8) had a viscosity of 1.4 cP and a surface tension of 23 mN/m. The Comparative Ink Compositions (IJR-7) and (IJR-8) exhibited a specific electric conductivity of 735 pS/cm and 667 pS/cm, respectively as a whole. Also, the Comparative Ink Compositions (IJR-7) and (IJR-8) exhibited a particle electric conductivity of blue resin particles of 551 pS/cm and 501 pS/cm, respectively. After forced elapsing at 45° C. for one week, the Comparative Ink Compositions (IJR-7) and (IJR-8) exhibited a specific electric conductivity of 445 pS/cm and 340 pS/cm, respectively as a whole. Also, the Comparative Ink Compositions (IJR-7) and (IJR-8) exhibited a particle electric conductivity of blue resin particles of 309 pS/cm and 221 pS/cm, respectively. Thus, the charge amount was reduced to not more than 60% of the initial charge amount, and therefore, it was noted that the change in the charge amount was large.

Next, electrostatic type inkjet drawing was conducted in the same manner as in Example 23 using the Comparative Ink Compositions (IJR-7) and (IJR-8). As a result, the drawn images gave a clear image of good quality with a satisfactory density without blur, However, when the drawing was conducted in the same manner as in Example 23 using the Comparative Ink Compositions (IJR-7) and (IJR-8) after forced elapsing at 45° C. for one week, any of the drawn images markedly blurred, and the image densities thereof were low. Also, since discharge failure occurred, lacks in the image were observed so that satisfactory images were not obtained.

Examples 24 to 27

<Preparation of Ink compositions (IJ-24) to (IJ-27)>

Ink Compositions (IJ-24) to (IJ-27) were each prepared in a manner exactly the same as in Example 23, except that in Example 23, the dispersion of pigment ream particles was diluted with Isopar G such that the concentration of the pigment resin particle content was 3.5%, and a compound shown in Table E was added as a charge control agent in place of the compound of Specific Example (1).

The particle electric conductivity and printing evaluation of each of the Ink Compositions (IJ-24) to (IJ-27) are shown in Table E. Also, the particle electric conductivity and printing evaluation of blue resin particles of each of the Ink Compositions (IJ-24) to (IJ-27) after forced elapsing at 45° C. for one week are shown in Table E.

TABLE E

| | | | Before thermo-elapsing | | After thermo-elapsing | |
|---|---|---|---|---|---|---|
| Example | Ink Composition | Compound of Specific Example | Particle electric conductivity (pS/cm) | Printing evaluation | Particle electric conductivity (pS/cm) | Printing evaluation |
| 24 | IJ-24 | (2) | 449 | ○ | 444 | ○ |
| 25 | IJ-25 | (3) | 468 | ○ | 473 | ○ |
| 26 | IJ-26 | (4) | 474 | ○ | 474 | ○ |
| 27 | IJ-27 | (5) | 480 | ○ | 471 | ○ |

Printing evaluation:

○: A drawn image had a satisfactory density without blur, and continuous printing could be stably conducted.

x: A drawn image blurred or had a low density, or continuous printing could not be stably conducted.

Example 28

<Preparation of Ink Composition (IJ-28)>

A composition of 100 parts by weight of Lionol Blue FG-7350 (Pigment Blue 15:3, manufactured by Toyo Ink Mg. Co., Ltd.) as a blue pigment, 200 parts by weight of an octadecyl ester of Nucrel N-699 (manufactured by Du Pont-Mitsui Polychemicals Co., Ltd.) as a resin, which is an ethylene/methacrylic acid copolymer (molar ratio of ethylene unit to octadecyl methacrylate unit: 96.4/3.6), and 300 parts by weight of Isopar G was charged in a TK Ross double planetary mixer, 130LDM Model (manufactured by Tokushu Rika Kogyo Co., Ltd.) and stirred and kneaded at 95° C. for one hour at a rotation number of 50 rpm. Further, 600 parts of Isopar G was dividedly added over 2 hours under this condition, and kneading was continued.

Next, the kneaded mixture was released into a stainless steel vat and cooled to room temperature to obtain a sponge-like kneaded mixture.

One hundred parts by weight of this kneaded mixture and 600 parts by weight of Isopar G were charged in a paint shaker (manufactured by Toyo Seiki Co., Ltd.) using glass beads having a diameter of 4 mm as media, and the mixture was previously dispersed for 20 minutes. The resulting preliminarily kneaded mixture was subjected to wet dispersion in a dynomill, KDL Model (manufactured by Shinmaru Enterprises Corporation) using glass beads having a diameter of from about 0.75 to 1 mm at 3,000 rpm for 6 hours, to obtained a dense dispersion.

Next, Ink Composition (IJ-28) was pr ed in a manner exactly the same as in Example 23, except that in Example 23, the dispersion of pigment resin particles was diluted with Isopar G such that the concentration of the pigment resin particle component was 3.5%, and 0.11 wt % of the compound of Specific Example (1) was added as a charge control agent. The pigment resin particles in the ink composition had a volume average particle size of 0.43 μm.

The resulting Ink Composition (IJ-28) had a viscosity of 1.4 cP, a surface tension of 23 mN/m, a specific electric conductivity of 744 pS/cm as a whole, and a particle electric conductivity of blue resin particles of 697 pS/cm. 90% or more of the charge amount of the ink composition was applied to the pigment resin particles, and clear positive charge property was revealed.

After forced elapsing at 45° C. for one week, the ink composition had a specific electric conductivity of 712 pS/cm and a particle electric conductivity of pigment resin particles of 668 pS/cm, respectively. Thus, it was noted that the charge amount did not substantially change and was extremely stable.

Electrostatic type inkjet drawing was conducted in the same manner as in Example 23 using the Ink Composition (IJR-28). As a result, the drawn image was stably printed with uniform dots without blur, whereby a clear image of good quality with a satisfactory density was given. Also, the discharge stability was good, and dot-form printing could be stably conducted even in continuous image drawing over a long period of time. Also, the drawn image after forced elapsing at 45° C. for one week gave a clear image of good quality with a satisfactory density without blur likewise the case before forced thermo-elapsing.

Comparative Example 9

<Preparation of Comparative Ink Composition (IJR-9)>

Comparative Ink Composition (IJR-9) was prepared in a manner exactly the same as in Example 24, except that in Example 24, the dispersion of pigment resin particles was diluted with Isopar G such that the concentration of the pigment resin particle component was 3.5%, and zirconium naphthenate (manufactured by Nihon Kagaku Sangyo Co., Ltd.) as a metallic soap was added as a charge control agent in place of the compound of Specific Example (1) such that the metal content was 0.08 wt %. The Comparative Ink Composition (IRJ-9) had a viscosity of 1.4 cP and a surface tension of 23 mN/m. The Comparative Ink Composition (IJR-9) exhibited a specific electric conductivity of 718 pS/cm as a whole and a particle electric conductivity of blue resin particles of 531 pS/cm, respectively. After forced elapsing at 45° C. for one week, the Comparative Ink Composition (IJR-9) exhibited a Specific electric conductivity of 435 pS/cm as a whole and a particle electric conductivity of blue resin particles of 312 pS/cm, respectively. Thus, the charge amount was largely reduced as compared with the initial charge amount, and therefore, it was noted that the change in the charge amount was large.

Next, electrostatic type inkjet drawing was conducted in the same manner as in Example 23 using the Comparative Ink Composition (IJR-9). As a result, the drawn images gave a clear image of good quality with a satisfactory density without blur. However, when the drawing was conducted in the same manner as in Example 23 using the Comparative Ink Composition (IJR-9) after forced elapsing at 45° C. for one week, the drawn image markedly blurred, and the image density thereof was low. Also, since discharge failure occurred, lacks in the image were observed so that satisfactory images were not obtained.

Examples 29 to 32

<Preparation of Ink Compositions (IJ-29) to (IJ-32)>

Ink Compositions (IJ-29) to (IJ-32) were each prepared in a manner exactly the same as in Example 24, except that in Example 24, the dispersion of pigment resin particles was diluted with Isopar G such that the concentration of the pigment resin particle component was 3.5%, and a compound shown in Table F was added as a charge control agent in place of the compound of Specific Example (1).

The particle electric conductivity and printing evaluation of each of the Ink Composition (IJ-29) to (IJ-32) are shown in Table F. Also, the particle electric conductivity and printing evaluation of blue resin particles of each of the Ink Compositions (IJ-29) to (IJ-32) after forced elapsing at 45° C. for one week are shown in table F.

TABLE F

| | | | Before thermo-elapsing | | After thermo-elapsing | |
|---|---|---|---|---|---|---|
| Example | Ink Composition | Compound of Specific Example | Particle electric conductivity (pS/cm) | Printing evaluation | Particle electric conductivity (pS/cm) | Printing evaluation |
| 29 | IJ-29 | (2) | 628 | ○ | 609 | ○ |
| 30 | IJ-30 | (3) | 647 | ○ | 620 | ○ |
| 31 | IJ-31 | (4) | 631 | ○ | 625 | ○ |
| 32 | IJ-32 | (5) | 649 | ○ | 629 | ○ |

Printing evaluation:
○: A drawn image had a satisfactory density without blur, and continuous printing could be stably conducted.
x: A drawn image blurred or had a low density, or continuous printing could not be stably conducted.

According to the electrostatic type inkjet ink composition of the invention containing as major components a non-aqueous solvent, a color material that is insoluble in the non-aqueous solvent, and a charge control agent that is soluble in the non-aqueous solvent and made of a long chain vinyl-half-amide maleic acid copolymer having a specific structure, it is possible to provide an oily ink composition of electrostatic mode inkjet printer having excellent dispersion stability, control in charge polarity and charge stability with time in a an electrostatic inkjet head of a color material concentration discharge type. Also, it is possible to provide an oily ink composition for electrostatic mode inkjet printer capable of printing dots in a high concentration and with less blur at a high speed.

This application is based on Japanese Patent application JP 2003-44500, filed Feb. 21, 2003, Japanese Patent application JP 2003-51020, filed Feb. 27, 2003, and Japanese Patent application JP 2003-51021, filed Feb. 27, 2003, the entire contents of those are hereby incorporated by reference, the same as if set forth at length.

What is claimed is:

1. An electrostatic inkjet ink composition comprising:
   a non-aqueous solvent having a dielectric constant of from 1.5 to 20 and a surface tension at 25° C. of from 15 to 60 mN/m;
   a color material that is insoluble in the non-aqueous solvent; and
   a charge control agent that is soluble in the non-aqueous solvent,
   wherein the charge control agent contains a polymer capable of being solubilized in the non-aqueous solvent, which is obtained by reacting a copolymer containing at least one monomer and maleic anhydride as constitutional units with a primary amino compound or a primary amino compound and a secondary amino compound and which is a polymer containing a half-amide maleic acid component and a maleinimide component as repeating units.

2. The electrostatic inkjet ink composition according to claim 1, wherein the ink composition has a volume resistivity at 25° C. of $10^8$ Ω cm or more, and particles of the color material in the ink composition have a particle electric conductivity of 100 pS/cm or more.

3. A method for forming an electrostatic inkjet image comprising;
   introducing an ink composition containing a non-aqueous solvent having a dielectric constant of from 1.5 to 20 and a surface tension at 25° C. of from 15 to 60 mN/m, a color material that is insoluble in the non-aqueous solvent, and a charge control agent that is soluble in the non-aqueous solvent, the charge control agent containing a polymer capable of being solubilized in the non-aqueous solvent, which is obtained by reacting a copolymer containing at least one monomer and maleic anhydride as constitutional units with a primary amino compound or a primary amino compound and a secondary amino compound and which is a polymer containing a half-amide maleic acid component and a maleinimide component as repeating units, into a recording head having a plurality of recording electrodes disposed therein;
   applying a voltage to the recording electrodes to allow an electrostatic force to act on the ink, thereby ejecting ink droplets in a state that particles of the color material are concentrated; and
   forming print dots on a recording medium disposed opposite thereto.

* * * * *